(12) United States Patent
LoGalbo et al.

(10) Patent No.: US 8,116,230 B2
(45) Date of Patent: Feb. 14, 2012

(54) ESTABLISHING COMMUNICATION PATHWAYS BETWEEN INFRASTRUCTURE DEVICES IN A GROUP COMMUNICATION SYSTEM IMPLEMENTED OVER A WIDE AREA NETWORK

(75) Inventors: Robert D. LoGalbo, Rolling Meadows, IL (US); Bradley M. Hiben, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 303 days.

(21) Appl. No.: 12/183,890

(22) Filed: Jul. 31, 2008

(65) Prior Publication Data

US 2010/0027443 A1 Feb. 4, 2010

(51) Int. Cl.
*H04L 12/28* (2006.01)
*H04B 7/00* (2006.01)

(52) U.S. Cl. ........ 370/254; 370/255; 455/517; 455/518; 455/519

(58) Field of Classification Search .............. 370/254, 370/255; 455/517–519
See application file for complete search history.

(56) References Cited

U.S. PATENT DOCUMENTS

| | | | |
|---|---|---|---|
| 6,836,481 B1* | 12/2004 | Hotta | 370/392 |
| 7,420,972 B1 | 9/2008 | Woo et al. | |
| 7,561,599 B2 | 7/2009 | Ekl et al. | |
| 7,746,799 B2 | 6/2010 | Kokot et al. | |
| 7,864,769 B1 | 1/2011 | Woo et al. | |
| 7,944,925 B2 | 5/2011 | Meier et al. | |
| 7,974,282 B2 | 7/2011 | Shibata et al. | |
| 7,978,718 B2 | 7/2011 | Farinacci et al. | |
| 2003/0207690 A1 | 11/2003 | Dorenbosch | |
| 2004/0266440 A1 | 12/2004 | Fuchs et al. | |
| 2005/0021833 A1* | 1/2005 | Hundscheid et al. | 709/236 |
| 2005/0221819 A1* | 10/2005 | Patel et al. | 455/432.1 |
| 2006/0056361 A1 | 3/2006 | Jiang et al. | |
| 2006/0176804 A1 | 8/2006 | Shibata et al. | |
| 2007/0049314 A1 | 3/2007 | Balachandran et al. | |
| 2007/0225024 A1 | 9/2007 | Li | |

(Continued)

OTHER PUBLICATIONS

PCT International Search Report Dated Jan. 27, 2010.
PCT International Search Report for Related U.S. Appl. No. 12/183,920 Dated Jan. 29, 2010.

(Continued)

*Primary Examiner* — Marsha D Banks Harold
*Assistant Examiner* — Saad Hassan
(74) *Attorney, Agent, or Firm* — Randi L. Karpinia; Anthony P. Curtis; Daniel R. Bestor

(57) ABSTRACT

A method and apparatus is provided for establishing communication pathways between infrastructure devices in a wide area communication network prior to transmission of a group message packet by a source wireless communication device (WCD). In one implementation, the infrastructure devices (IDs) can include a home ID of the source WCD, a first ID and a second ID. A home steward module (HSM) of the source WCD generates a distribution list (DL) for communications from the source WCD to a first communication group (CG), and communicates it to an envoy packet duplicator module (EPDM) located at the first ID. The first CG includes, for example, a first destination WCD. A first network socket of the EPDM is communicated from the HSM to a second envoy module (located at the second ID) for the first destination WCD. The HSM maps a second network socket for the second envoy module to an identifier of the first destination WCD, and communicates this mapping to the EPDM. A first communication connection can then be established between the first network socket and the second network socket.

24 Claims, 15 Drawing Sheets

U.S. PATENT DOCUMENTS

| | | | |
|---|---|---|---|
| 2008/0084839 A1 | 4/2008 | Xie et al. | |
| 2008/0107090 A1* | 5/2008 | Thomson et al. | 370/338 |
| 2008/0137682 A1* | 6/2008 | Kish et al. | 370/432 |
| 2008/0146230 A1* | 6/2008 | Pandian et al. | 455/436 |
| 2008/0186896 A1* | 8/2008 | Fanfelle et al. | 370/312 |
| 2008/0305791 A1 | 12/2008 | Hiben et al. | |
| 2009/0113059 A1 | 4/2009 | LoGalbo et al. | |
| 2009/0147718 A1* | 6/2009 | Liu et al. | 370/312 |
| 2009/0262677 A1* | 10/2009 | Banerjea et al. | 370/312 |

OTHER PUBLICATIONS

PCT International Preliminary Report on Patentability for Related U.S. Appl. No. 12/183,920 Dated Feb. 1, 2011.

PCT International Preliminary Report on Patentability Dated Feb. 1, 2011.

USA Office Action for Related U.S. Appl. No. 12/183,920 Dated Aug. 2, 2011.

* cited by examiner

ESTABLISHING COMMUNICATION PATHWAYS BETWEEN INFRASTRUCTURE DEVICES IN A GROUP COMMUNICATION SYSTEM IMPLEMENTED OVER A WIDE AREA NETWORK

RELATED APPLICATIONS

The present application is related to the following U.S. application commonly owned with this application by Motorola, Inc.: Ser. No. 12/183,920, filed Jul. 31, 2008, titled "COMMUNICATING A GROUP MESSAGE PACKET OVER A WIDE AREA NETWORK," the entire contents of which being incorporated herein by reference.

FIELD OF THE DISCLOSURE

The present disclosure relates generally to wide area communication networks and more particularly to methods and apparatus for wireless communications implemented over a wide area network.

BACKGROUND

Multi-site land mobile radio systems typically utilize leased communication lines to interconnect radio repeater infrastructure devices with a central call control server. The recurring costs of the leased communication lines, as well as the capital investment required to deploy multiple radio repeater infrastructure devices and a specialized call control server can result in relatively high system costs. Multi-site land mobile radio systems are primarily utilized to provide emergency communications to police officers, fire fighters and other emergency responders.

Professional and commercial entities, such as retail store chains, school systems, utilities companies, transportation companies and generation companies, can also benefit from the use of multi-site land mobile radio systems but, due to the recurring costs and the required capital investment, such entities generally do not deploy such systems. Companies who operate over large geographic areas or in different regions may require hundreds or even thousands of radio repeater infrastructure devices to implement a suitable multi-site land mobile radio system. Moreover, such a system would require multiple central call servers, which themselves would need to be connected over separate leased lines, thus creating significant additional operational expenses.

One alternative for enabling communications between users of such entities are dispatch systems designed to operate over a wide area network (WAN) that includes multiple physical infrastructure devices distributed over a wide area. At each physical infrastructure device, minimal complexity infrastructure devices (e.g., base stations) are provided that are designed to communicate with one another over a wired network and are designed to communicate with wireless communication devices (WCDs) wirelessly or over-the-air (OTA). An infrastructure device provided at a particular physical site can locate and establish connections to other infrastructure devices deployed at other physical sites directly over the Internet (or other WAN). As such, the infrastructure devices can communicate with each other without communicating through a centralized call control center, such as a Mobile Switching Center (MSC), or public telephone network, etc. This greatly reduces the costs for the entities who purchase the infrastructure devices to set up a dispatch system. Once the infrastructure devices have established a connection with one another other over the Internet, wireless communication devices located at one particular physical site can then communicate (via the infrastructure device) with other wireless communication devices located at the other physical sites. In many cases, such networks also support "group call" and/or push-to-talk functionality for allowing simultaneous communications to a group of users.

Mobile Internet Protocol (MIP)

Mobile IP (MIP) is an Internet Engineering Task Force (IETF) standard communications protocol that is designed to allow mobile devices to move from one network to another while maintaining a permanent IP address. Using Mobile IP, nodes may change their point-of-attachment to the Internet without changing their IP address. In the MIP, a mobile node (MN) can have two addresses—a permanent home address and a care-of-address, which is associated with the network the mobile node is visiting. Each MN is identified by its home address disregarding its current location in the Internet. When a MN is away from its home agent (HA), the MN is associated with a care-of address which gives information about its current location.

Two other entities in the MIP are IP nodes (e.g., routers) referred to as a home agent and a foreign agent. A home agent (HA) stores information about mobile nodes whose permanent address is in the HA's network. The HA serves as the anchor point for communication with the MN, and tunnels packets from Corresponding Nodes (CNs) towards the current care of address of the MN and vice-versa. A foreign agent (FA) stores information about mobile nodes visiting its network. FAs also advertise care-of addresses, which are used by MIP. The FA periodically advertises its presence wirelessly and waits for a solicitation message from a roaming MN.

The MIP specifies how a MN registers with its home agent and how the home agent routes datagrams to the mobile node through a tunnel. For example, when MN roams to a new subnet, it must discover and register itself with a nearby FA. The MN issues a wireless registration request to trigger the registration process. The FA forwards that request to that client's original HA. If the request is accepted, a tunnel is established between the HA and FA to relay incoming packets sent to the client's original IP address. Wired messages can then be exchanged between the HA and the FA.

A node wanting to communicate with the MN uses the home address of the MN to send packets (e.g., data packets, voice or audio packets, video packets). When the HA receives the packets, the HA uses a table to determine their destination and tunnels (forwards or redirects) the packets to the MN's care-of address (i.e., the FA in the MN's new subnet) with a new IP header, preserving the original IP header. The packets are decapsulated at the end of the tunnel to remove the added IP header and delivered to the MN.

By contrast, when acting as sender, MN sends packets to the destination node through the FA. The FA can route outbound packets through the tunnel from the FA to HA, and then on to their destination node. This is known as triangular routing since packets take a "triangle routing path" that involves communications between the MN, its FA and the HA of the destination node. As such, in MIP, packets are always routed to the HA first and never directly to the MN.

Although MIP preserves subnet connectivity for a roaming MN, the MIP always involves communicating through the HA of the MN. Moreover, the MN must first regain over the air connectivity with its new FA before an agent discovery phase begins. Furthermore, the registration process involves wire line and wireless communication. The MIP architecture works well for non-real time data, but encounters problems when used for real time data and voice data due to relatively long latency. These characteristics of the MIP can result in considerable reconnection time, longer roaming delays and increased latency. The amount of packet loss can make the MIP unsuitable for use in wide area networks such as those described above. Moreover, the performance of MIP is poor when used for low-latency group voice calls, where there are multiple destinations that are potentially mobile and can be at any site that is part of the network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
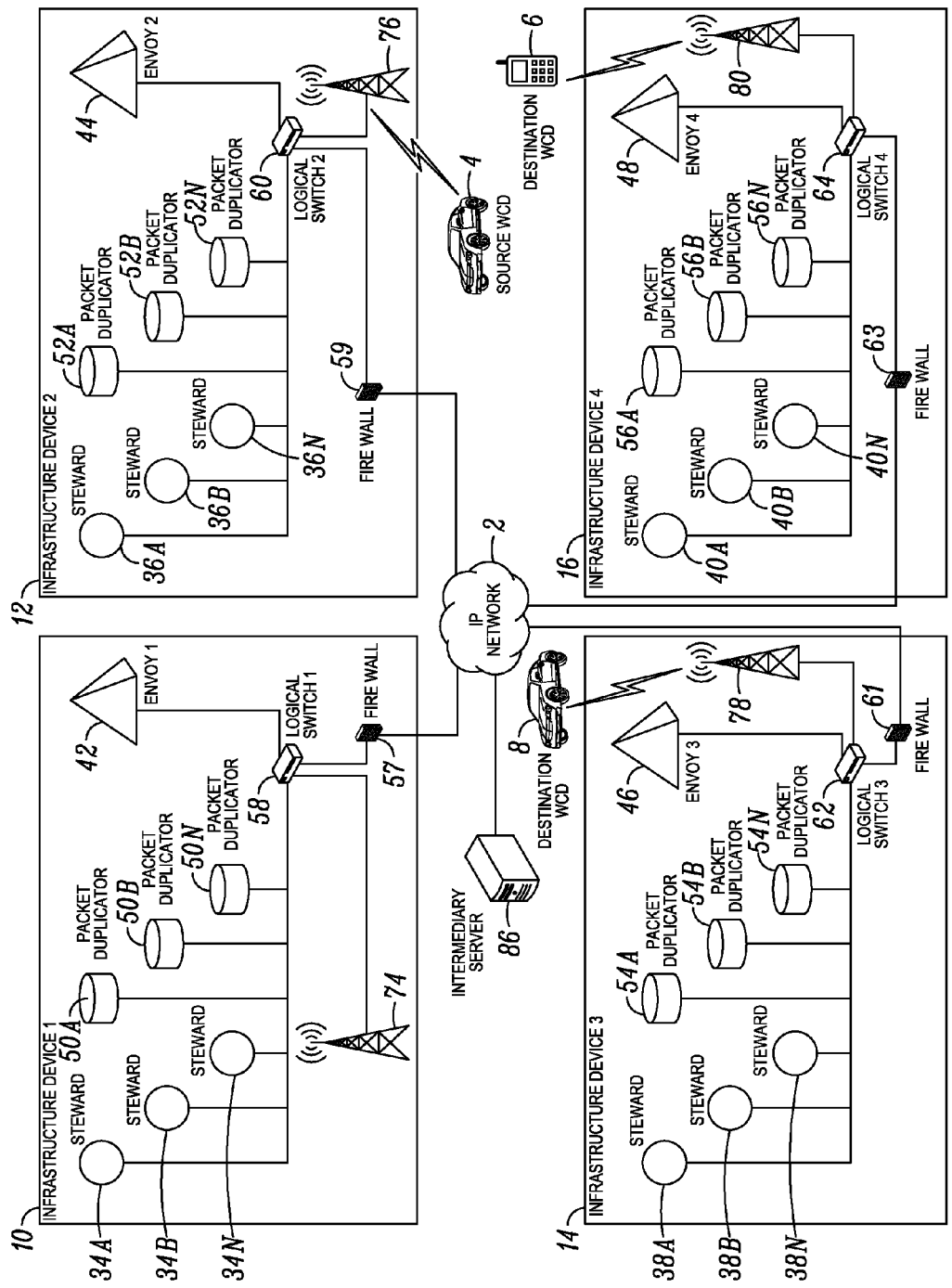
FIG. 1 is a block diagram which illustrates a wide area communications network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the present invention generally relate to a method for establishing communication pathways between infrastructure devices in a wide area communication network. In one implementation, the infrastructure devices can include a home infrastructure device of a source wireless communication device (WCD), a first infrastructure device and a second infrastructure device. A home steward module of the source WCD generate a destination WCD distribution list, and communicates the destination WCD distribution list to an envoy packet duplicator module located at the first infrastructure device. The distribution list is for communications from the source WCD to a first communication group that also includes, for example, a first destination WCD. A first network socket of the envoy packet duplicator module is communicated from the home steward module to a second envoy module for the first destination WCD is located at the second infrastructure device. The home steward module generates a first mapping that maps a second network socket for the second envoy module to an identifier of the first destination WCD, and communicates the first mapping to the envoy packet duplicator module. A first communication connection can then be established between the first network socket and the second network socket prior to transmission of a group message packet by the source WCD to the first communication.

Embodiments of the present invention can apply to a number of network configurations. Prior to describing some embodiments with reference to FIGS. 3-15, one example of a network configuration in which these embodiments can be applied will now be described with reference to FIG. 1.

FIG. 1 is a block diagram which illustrates a wide area communication network 90. The communication network 90 includes both wired communication links represented by lines and wireless communication links represented by "lightening bolt" symbols. The communication network 90 includes a plurality of sub-networks each defined by a respective infrastructure device 10, 12, 14, 16, a plurality of wireless communication devices (WCDs) 4, 6 and 8, and an intermediary server 86 that are coupled to and communicate via IP network 2. The IP network 2 may comprise a wide area network (WAN), such as the Internet, an Intranet, one or more local area networks (LANs), one or more metropolitan area networks (MANs), and other networks which allow communication signals to be propagated over a wide area.

Peer Infrastructure Devices

The infrastructure devices 10, 12, 14, 16 are deployed over a wide area at different physical sites and are coupled to one another over the IP network 2. The different physical sites are physically separated from each of the other physical sites, and in some cases the physical separation between sites can be hundreds or even thousands of miles. The infrastructure devices 10, 12, 14, 16 process call control in parallel without a centralized call control module for the communication network 90

As illustrated in FIG. 1, each of the infrastructure devices 10, 12, 14, 16 can include similar modules. Each of the infrastructure devices 10, 12, 14, 16 includes an envoy module 42, 44, 46, 48 each being coupled to its corresponding logical switch 58, 60, 62, 64, a plurality of steward modules 34A . . . 34N, 36A . . . 36N, 38A . . . 38N, 40A . . . 40N each being coupled to their corresponding logical switch 58, 60, 62, 64, and a plurality of packet duplicator modules 50A . . . 50N, 52A . . . 52N, 54A . . . 54N, 56A . . . 56N each being coupled to their corresponding logical switch 58, 60, 62, 64. Notably, at each infrastructure device 10-16, the steward modules 34A . . . 34N, 36A . . . 36N, 38A . . . 38N, 40A . . . 40N and the envoy module 42, 44, 46, 48 are implemented within a common infrastructure device. For instance, infrastructure device 10 includes an envoy module 42, a plurality of steward modules 34A . . . 34N and a corresponding plurality of packet duplicator modules 50A . . . 50N. The envoy module 42, the steward modules 34A . . . 34N and the packet duplicator modules 50A . . . 50N are coupled to the logical switch 58. Infrastructure device 10 also includes a communication module 74 that is coupled to the logical switch 58 and is designed to wirelessly communicate with wireless communication devices, and optionally a firewall 57 that is coupled between the IP network 2 and the logical switch 58.

The steward modules, envoy modules, packet duplicator modules, and logical switches can be implemented in hardware, software executed on a computer-based processing system, or a combination of hardware and software executed on a computer-based processing system. In one implementation, in the envoy modules, logical switches, steward modules, and packet duplicator modules can be implemented software modules stored on a computer-readable storage medium having computer readable code stored thereon for programming a computer or other processor implemented within the infrastructure devices. In such cases, the term "module" or "modules" is interchangeable with "software module" or "software modules" when used with any of the terms envoy, steward, or packet duplicator.

Steward Modules

In the example illustrated in FIG. 1, the steward modules 34B, 36N, 38A support communications for WCDs 4, 6, 8, respectively. Home infrastructure devices 10, 12, 14 of WCDs 4, 6, 8, respectively, are the infrastructure devices with which the steward modules 34B, 36N, 38A are associated, regardless of where the WCDs 4, 6, 8 have initially established network presence with and communications through other infrastructure devices 12, 16, 14. For example, each of the steward modules 34B, 36N, 38A maintain network presence information for their respective WCDs 4, 6, 8. For instance, when the infrastructure device 10 is the home infrastructure device for the WCD 4, the steward 34B can support call processing for the WCD 4, even though WCD 4 roams outside communication range of the infrastructure device 10, hands over to (or otherwise establishes network presence at) infrastructure device 12 and is now communicating through infrastructure device 12. When the WCD 4 hands over to (or otherwise establishes network presence at) the infrastructure device 12, information about such event can be communicated to the steward 34B by WCD 4, the infrastructure device 12, or by any other suitable component of the communication network 90. When the infrastructure device 10 receives information addressed to WCD 4, the steward 34B can forward such information to the infrastructure device 12, which can then transmit the content to WCD 4.

Envoy Modules

Envoy module 42 can broker communication setup between the WCDs 4, 6, 8 and their home steward modules 34B, 36N, 38A with which the WCDs 4, 6, 8 are associated. In contrast to services provided by the steward modules 34B, 36N, 38A, the services provided by the envoy modules can be location dependent. For example, envoy module 42 can broker call setup for any WCDs that become affiliated with (i.e., establish network presence at) the infrastructure device 10; envoy module 44 can broker call setup for any WCDs that become affiliated with the infrastructure device 12; and envoy module 46 can broker communication setup for any WCDs that become affiliated with the infrastructure device 14. For instance, when WCD 4 becomes affiliated with the infrastructure device 12, whose home infrastructure device is infrastructure device 10, then the envoy 44 can broker call setup between the WCD 4 and its home steward module 34B by forwarding setup information to other steward modules. The setup information can include, for example, identifiers received from the WCDs 4, 6, 8 that identify one or more groups with which the WCDs 4, 6, 8 are associated. A particular group can be represented by a single group identifier and/or a list of one or more recipients that are members of a group.

Packet Duplicator Modules

Packet duplicator modules 50A . . . 50N, 52A . . . 52N, 54A . . . 54N, 56A . . . 56N duplicate the group message packet(s) that have a plurality of intended WCDs, and communicate such duplicated information units to their intended destination WCDs. For example, when WCD 4 transmits one group message packet intended for two WCDs such as 6, 8, WCD 4 can communicate this one group message packet to its home steward module 34B, which can then forward the one group message packet and multiple recipient identifiers to the packet duplicator 50B. The packet duplicator 50B can duplicate the group message packet into as many duplicates as may be necessary (in this example duplicates to get a total number of two) to communicate the group message packet to each of the WCDs 6, 8 identified by the recipient identifiers. A recipient identifier can be a telephone number, an Internet Protocol (IP) address, a Media Access Control (MAC) address, a uniform resource locator (URL), or any other identifier for identifying an intended recipient or destination of the packet. For example, in an implementation in which the IP address, MAC address or URL of a recipient's home steward (e.g. home steward 38) is known to the steward 34, the steward 34 also can communicate to the packet duplicator 50 the IP address, MAC address or URL of the recipient's home steward, which also can be an IP address, a URL, a MAC address or any other suitable identifier. In this example, the packet duplicator 50B generates two (2) unique recipient identifiers to which the duplicated media packets will be addressed.

The envoy modules, logical switches, steward modules, and packet duplicator modules will be described in greater detail below.

IP Addresses, Port Numbers and Sockets

Each of the infrastructure devices can have IP addresses and its corresponding envoy, steward and packet duplicators modules or "processes" each have a Transmission Control Protocol (TCP) port number or User Datagram Protocol (UDP) port number. As such, each of the infrastructure devices can be identified based on its Internet Protocol (IP) address, whereas the envoy, steward and packet duplicators modules at each infrastructure device can be identified by a network socket that is an end-point of a bidirectional process-to-process communication flow. A network socket is specified as a socket number that is a combination of a layer 3 (L3) IP address and a layer 4 (L4) TCP/UDP port number. In some implementations, the network socket can be identified by an operating system as a unique combination of the following: the protocol (TCP, UDP or raw IP), the local IP address, and the local TCP/UDP port number.

To explain further, a communication flow takes place between a local socket and a remote socket sometimes referred to as a socket pair. The processes/modules involved in the communication flow can be referred to as a local or source process/module having a local socket and a remote or destination process/module having a remote socket. In some cases, the local and remote sockets can take place in the same machine such as within an infrastructure device. In other cases, the local and remote sockets can take place in different machines communicating with each other across an IP network, such as the Internet. Each socket is mapped to an application process (or thread), and serves as an interface between the application process (or thread) and logical switches provided in the operating system's TCP/IP or UDP/IP protocol stack.

Logical Switches

The infrastructure devices 10, 12, 14, 16 each include a logical switch 58, 60, 62, 64 that will now be described with reference to infrastructure device 10. Infrastructure device 10 includes a logical switch 58 can direct data to/from the appropriate components and modules within the infrastructure device 10. For instance, the logical switch 58 can direct information received by the communication module 74 to one or more of the various modules 34, 42, 50, 57 of the infrastructure device 10 (e.g., envoy 42), and direct information that is to be communicated over the IP network 2 from one or more of the various modules 34, 42, 50, 57 of the infrastructure device 10 to communication module 74.

The logical switch 58 can be implemented as part of an Operating System's (OS's) IP/TCP/UDP protocol stack. The logical switch 58 determines which process/module a packet is to be routed to, and forwards incoming IP data packets to the corresponding processes/modules by extracting the socket address information from the IP, UDP and TCP headers. For example, when the logical switch 58 receives a packet from the Internet, the logical switch 58 will check the destination IP address to confirm that the packet is destined for the IP address of the infrastructure device 10. If not, the logical switch 58 will discard the packet. If so, the logical switch 58 will use the socket number to determine which port number the packet is intended for, and then route the packet to the appropriate module 34, 42, 50, 57, 74 within the infrastructure device (that has been assigned that port number specified by the socket number). In addition, when the logical switch 58 receives a packet from an module within the infrastructure device 10, the logical switch 58 will examine the packet's destination IP address. If the packet's destination IP address is different than the IP address of the infrastructure device 10 that hosts the logical switch 58, the logical switch 58 will send the packet to the IP network 2 or LAN. If the packet's destination IP address is the same as the IP address of the infrastructure device 10 that hosts the logical switch 58, then the logical switch 58 will determine that the packet is destined for another module 34, 42, 50, 57, 74 within the infrastructure device 10. The logical switch 58 will then use the socket number to determine which port number the packet is intended for so that the logical switch 58 can route the packet to the appropriate module within the infrastructure device 10 that has been assigned that port number.

Intermediary Server

The optional intermediary server 86 can also be provided as part of the communication network 90. The intermediary server 86 is optional and not used in all embodiments. As illustrated in FIG. 1, the intermediary server 86 is coupled to the IP network 2. In one implementation, the intermediary server 86 may comprise a network adapter via which the intermediary server 86 communicates with the infrastructure devices 10-16. The network adapter can comprise one or more of a communications modem, wired and/or wireless transceiver, and/or any other device(s) for communicating with the IP network 2. The intermediary 86 can be configured to facilitate communications among the infrastructure devices 10-16.

Because the intermediary server 86 is not behind a firewalls 57, 59, 61, 63, the intermediary server 86 can perform a port forwarding function between any of the infrastructure devices 10-16 or any of their respective envoy modules, logical switches, steward modules, and packet duplicator modules that access the intermediary server 86. For instance, if a packet that has source processA:socketA is sent to the intermediary server 86 from module #1, and another packet that has source processB:socketB is sent to the intermediary server 86 from module #2, the intermediary server 86 can forward the packet that has source processB:socketB to module #1 and can forward the packet that has source processA:socketA to module #2. ProcessA and processB can then establish direct (P2P) communication with each other. Such processes is described, for example, in United States Patent Application Publication Number 20080305791, entitled "Peer-to-peer Wide Area Communications System," published Dec. 11, 2008 and assigned to the assignee of the present invention, which is incorporated herein by reference in its entirety.

Moreover, if the infrastructure devices 10, 12 are protected by their respective firewalls 57, 59, the intermediary server 86 can provide a rendezvous point through which infrastructure devices 10, 12 can communicate since the intermediary server 86 is not behind the firewalls 57, 59, 61, 63. For example, in one application, the intermediary server 86 can receive a request from an infrastructure device 10, 12, 14, 16 (or any of their respective envoy modules, logical switches, steward modules, and packet duplicator modules) which is attempting to establish a communication session with one or more of the WCDs 4, 6, 8, or a group of the WCDs, but cannot directly access the WCDs due to lack of knowledge of the current addresses and/or location of the WCDs 4, 6, 8. When the intermediary server 86 receives such a request, the intermediary server 86 can access one or more data tables (or data files) to retrieve relevant mapping information and provide such mapping information to a system associated with the request.

For instance, the infrastructure devices 10, 12, 14, 16 (or any of their respective envoy modules, logical switches, steward modules, and packet duplicator modules) can register address/identifier mapping information that allows these modules to locate one another. This address/identifier mapping information can be provided in data tables (or files) such as: (1) a table that maps infrastructure device identifiers/network sockets, (2) a table that maps WCD identifiers to home steward identifiers, (3) a table that maps steward identifiers to steward network sockets, (4) a table that maps WCD identifiers to steward identifiers to steward network sockets, (5) a table that maps envoy identifiers to envoy network sockets, etc.

Alternatively, this address/identifier mapping information can be pre-provisioned at the intermediary module and can accessed by any of the infrastructure devices (or any of their respective envoy modules, logical switches, steward modules, and packet duplicator modules). The data tables (or data files) can be stored on a suitable data storage accessible by the intermediary server 86, for example, an electronic storage medium, a magnetic storage medium, an optical storage medium, a magneto-optical storage medium, and/or any other storage medium suitable for storing digital information. More information relating to the intermediary server 86 is described in, for example, in United States Patent Application Publication Number 20080305791, referenced above.

Wireless Communication Devices

The wireless communication devices (WCDs) 4, 6, 8 can access the IP network 2 via infrastructure devices 10, 12, 14, 16. The WCDs 4, 6, 8 can communicate with one another via the infrastructure devices 10, 12, 14, 16 over IP network 2. The WCDs 4, 6, 8 have the ability to move from place-to-place throughout the network 90. Without limitation, the WCDs 4, 6, 8 can be, for instance, mobile stations (e.g. mobile telephones, mobile two-way radios, mobile computers, personal digital assistants, or the like), computers, wireless gaming devices, access terminals, subscriber stations, user equipment, or any other devices configured to communicate via wireless communications. Although not illustrated in FIG. 1, the WCDs 4, 6, 8 can comprise one or more processors/controllers, transceivers, and/or other suitable components. Each WCD has one or more unique identifiers associated therewith that can be, for example, a telephone number, an IP address, a MAC address, a uniform resource locator (URL), or any other identifier for identifying an intended recipient or destination of the packet.

Each of the WCDs 4, 6, 8 is initially associated with an infrastructure device. As the WCDs 4, 6, 8 move about the network 90, the WCDs can communicate through other infrastructure devices. For instance, in this example, WCD 4 is initially associated with infrastructure device 10, but then moves or roams to another area where it is in communication with the network 90 via infrastructure device 12. In this particular example, the WCDs 4, 6, 8 are part of a particular communication group.

As will be described in greater detail below, when desired, any one of the WCDs illustrated can simultaneously communicate with other members of the group by transmitting group message packets to other members of the group. As used herein, the term "group message packet" refers to a unit of data that is routed between an origin WCD and one or more destination WCDs on a packet-switched network. The information communicated within a "group message packet" can be any type of media packets including, for example, audio or "voice" packets, video packets, image packets, text packets, etc.

Firewall

The firewall 57 is an optional module and need not be deployed in all embodiments. The firewall 57 is coupled to its corresponding logical switch 58 and includes a number of logical ports. The firewall 57 can be implemented as hardware device, a set of devices, dedicated appliance, and/or software module running on another computer. As used herein, the term "firewall" can refer to a module that inspects network traffic passing through it, and denies or permits passage based on a set of rules. In some implementations, a firewall can be configured to permit, deny, encrypt, or proxy all computer traffic between different security domains based upon a set of rules and other criteria. The firewall 57 prevents unauthorized access to or from the infrastructure device 10 by selectively opening and closing the logical ports (not illustrated) of the infrastructure device 10. For example, the firewall 57 can selectively open a logical port when the infrastructure device 10 is communicating a message through the logical port, and the firewall 57 can maintain the logical port open for a period of time to receive an acknowledgement or response to the message that was sent. If no further messages are communicated through the logical port prior to expiration of the time period, the firewall 57 can close the logical port. Although not illustrated, in some implementations, a firewall can have network address translation (NAT) functionality (i.e., NAT-enabled firewalls), and the hosts protected behind a firewall commonly have addresses in a "private address range," as defined in IETF Request for Comments (RFC) 1918. Firewalls often have such functionality to hide the true address of protected hosts. In some embodiments, the NAT functionality can be implemented in a separate module outside the respective firewalls.

Communication Modules

As mentioned above, each of the infrastructure devices 10, 12, 14, 16 includes a communication module 74, 76, 78, 80 that will now be described with reference to communication module 74.

Although not illustrated, the communication module 74 can include one or more antennas, and one or more transceiver module(s) (not illustrated). In some implementations, the communication module includes a separate modulator-demodulator (modem) module (not illustrated), while in other implementations the modem functionality is implemented as part of the transceiver module.

The antenna (not illustrated) intercepts transmitted signals from one or more WCDs within the network 90 and transmits signals to the one or more WCDs within the network 90. The antenna is coupled to the transceiver module, which employs conventional demodulation techniques for receiving and which employs conventional modulation techniques for transmitting communication signals, such as packetized digital or circuit digital signals, to and from the WCDs. The packetized data signals can include, for example, voice, data or multimedia information, and packetized digital or circuit digital control signals. The transceiver sends a signal via the antenna to one or more WCDs within the network 90. In an alternative embodiment (not shown), the communication module 76 includes a receive antenna and a receiver for receiving signals from the network 90 and a transmit antenna and a transmitter for transmitting signals to the network 90. The term transceiver is used herein in a non-limiting sense. For example, as used herein, the term "transceiver" can refer to a transmitter-receiver. In some implementations, a transceiver can refer to a device which contains both a receiver unit and a transmitter unit, where these units are separated and share no common circuitry is common between transmit and receive functions. In other implementations, a transceiver can be a single device that has both a transmitter unit and a receiver unit which are combined and share common circuitry or a single housing. In some implementations, the infrastructure devices 10-16 each can include one or more respective transceivers to support communications with the WCDs 4, 6, 8. In some implementations, the transceivers include "modem" functionality and can modulate and demodulate signals to convert signals from one form to another, and then transmit and/or receive such signals over one or more various wireless communication links. As used herein, the term "modem" can refer to a module that modulates an analog carrier signal to encode digital information, and also demodulates such a carrier signal to decode the transmitted information. The modem can be implemented using one or more hardware device(s), dedicated appliance, and/or software module running on another computer. As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA. The transceivers can be configured to communicate data via IEEE 802 compliant wireless communications including, for example, IEEE 802.11 network standards including 802.11a, 802.11b, 802.11g, 802.11n, 802.11e or 802.11s, and IEEE 802.16 based network standards including 802.16e, 802.16j, 802.16m and IEEE 802.15 network standards including 802.15.3, 802.15.4, etc. In another example, the transceivers can communicate data via Time Division Multiple Access (TDMA) and variants thereof, Code Division Multiple Access (CDMA) and variants thereof such as wideband CDMA (WCDMA), Orthogonal Frequency Division Multiple Access (OFDMA), or direct wireless communication. Moreover, in some embodiments, one or more of the transceivers can communicate with the WCDs 4, 6, 8 using a personal radio service, for instance in accordance with the guidelines established by the U.S. Federal Communications Commission (FCC) for the General Mobile Radio Service (GMRS) and/or the Family Radio Service (FRS), although the invention is not limited in this regard.

In one implementation each communication module can include a network adapter that includes transceiver and modem functionality. As used herein, the term "network adapter" can refer to computer hardware designed to allow computers to communicate over a computer network. The network adapters can comprise, for example, a communications modem, wired and/or wireless transceivers, and/or any other devices that can communicate over the IP network 2. The network adapters can allow the infrastructure devices 10-16 to communicate with intermediary server 86 and with one another over the IP network 2.

Distribution of a Group Message Packet

Figure 2:
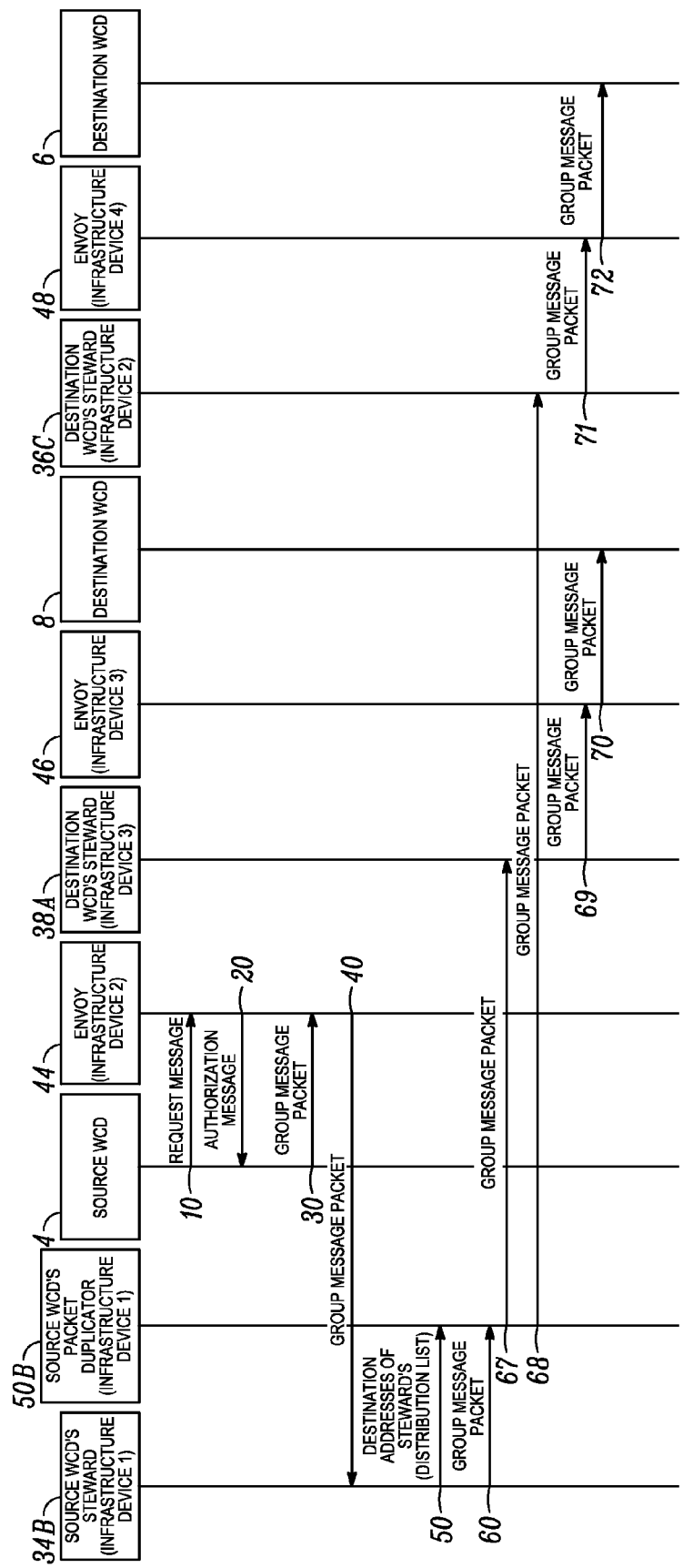
FIG. 2 is a message flow diagram which illustrates distribution of information from a wireless communication device (WCD) at one infrastructure device to other wireless communication devices (WCDs) at other infrastructure devices in the communications network of FIG. 1.

FIG. 2 is a message flow diagram which illustrates distribution of information from a source wireless communication device (WCD) 4 at one infrastructure device 12 to other destination wireless communication devices (WCDs) 6, 8 at other infrastructure devices 16, 14 in the communications network 90 of FIG. 1.

Each WCD 4, 6, 8 is associated with a home infrastructure device and has a steward module at the home infrastructure device. Because the WCDs 4, 6, 8 can be either mobile or portable, the WCDs 4, 6, 8 can move or roam away from their home infrastructure device such that they are now communicating through a foreign infrastructure device that is part of the network. In many scenarios, it is likely that the various WCDs 4, 6, 8 have roamed away from their home infrastructure device. In the following example, WCD 4 is initially associated with infrastructure device 10, and in particular steward 34B and packet duplicator 50B. In other words, infrastructure device 10 is the "home" infrastructure device for WCD 4. WCD 4 then roams to infrastructure device 12, and communicates through infrastructure device 12.

When the source WCD 4 (similar to a mobile node in the MIP) seeks to transmit a group message packet to WCD 8 at infrastructure device 14 and WCD 6 at infrastructure device 16, the user of the source WCD 4 can request the channel at step 10, for example, by pushing a button, which sends a request to an envoy module 44 at the infrastructure device 12. If channel resources are available, the envoy module 44 responds with an authorization message at step 20, and at step 30, the source WCD 4 sends the group message packet to the envoy module 44 at infrastructure device 12 (similar to a foreign agent in the MIP). WCD 4 first communicates the group message packet to the envoy 44 which forwards the group message packet to the steward 34B for WCD 4.

At step 40, the envoy module 44 routes the group message packet to the steward module 34B for the source WCD 4. The steward module 34B is similar to a home agent in the MIP, and is located at infrastructure device 10. Link Establishment between modules, especially those behind different firewalls, is described, for example, in United States Patent Application Publication Number 20090113059, entitled "Method And Apparatus For Peer To Peer Link Establishment Over A Network," published Apr. 30, 2009 and assigned to the assignee of the present invention, which is incorporated herein by reference in its entirety.

Each steward module 34B, 36N, 38A can register its network socket with intermediary 86. Each steward module 34B, 36N, 38A can build or generate a distribution list (DL) for communicating with destination of WCDs that are to receive group message packets communicated by one of the steward's associated WCDs. The distribution list (DL) includes: a list of destination WCD identifiers (DWCD_IDs) (e.g., MAC address) for each of the destination WCDs that belong to a communication group associated with a particular communication group identifier. For instance, steward 34B of the source WCD 4 can build a distribution list of destination WCDs 6, 8 that are to receive group message packets communicated by the source WCD 4.

At step 50, the steward module 34B of the source WCD 4 then provides a distribution list to a packet duplicator module 50B associated with that steward module 34B and co-located at the infrastructure device 10. The distribution list includes network sockets of the stewards for WCDs 6, 8. At step 60, the steward module 34B of the source WCD 4 then provides the group message packet to the packet duplicator module 50B associated with that steward module 34B.

At steps 67 and 68, the packet duplicator module 50B forwards the group message packet and the destination WCD identifiers to the WCD's respective steward modules 38A, 36N. At steps 69 and 71, the other steward modules 38A, 36N of the other destination WCDs 8, 6 then forward the group message packet to respective envoy modules 46, 48 at the infrastructure devices 12, 16 where the other destination WCDs 8, 6 are currently located. At steps 70 and 72, the envoy modules 46, 48 then communicate the group message packet to the destination WCDs 8, 6, respectively.

With this approach, the number of hops the group message packet must traverse when going from the source WCD 4 to the destination WCDs 6, 8 is significant and can incur significant throughput delay. This can be problematic when the group message packet is audio or voice since the greater the perceived listening throughput delay the worse the audio quality.

In some implementations, it would be desirable to simplify the communication sequence since it involves communication of the group message packet back to the home infrastructure device 10 of the device 4 that originated the group message packet, and even once the group message packet arrives at the home infrastructure device 10, two more modules 34B, 50B at the home infrastructure device 10 must process the packet before sending it over the WAN 2. This is a complex message exchange.

It would be desirable to reduce the number of hops the group message packet must traverse by eliminating message exchanges between the receiving infrastructure device 12 and the home infrastructure device 10 when communicating the group message packet to other WCDs 6, 8 located at other infrastructure device 14, 16.

It would also be desirable to eliminate involvement of the steward 34B and packet duplicator 50B when communicating the group message packet to other devices 6, 8 that belong to the group. For instance, it would be desirable to eliminate the need for communicating the group message packet from the envoy 44 at infrastructure device 12 to the steward 34B, sending the group message packet and a steward address distribution list from the steward 34B to the packet duplicator 50B, and then separately transmitting the group message packet from the packet duplicator 50B to the stewards 38A, 36N at infrastructure devices 14, 12.

Envoy Packet Duplicator Modules

Figure 3:
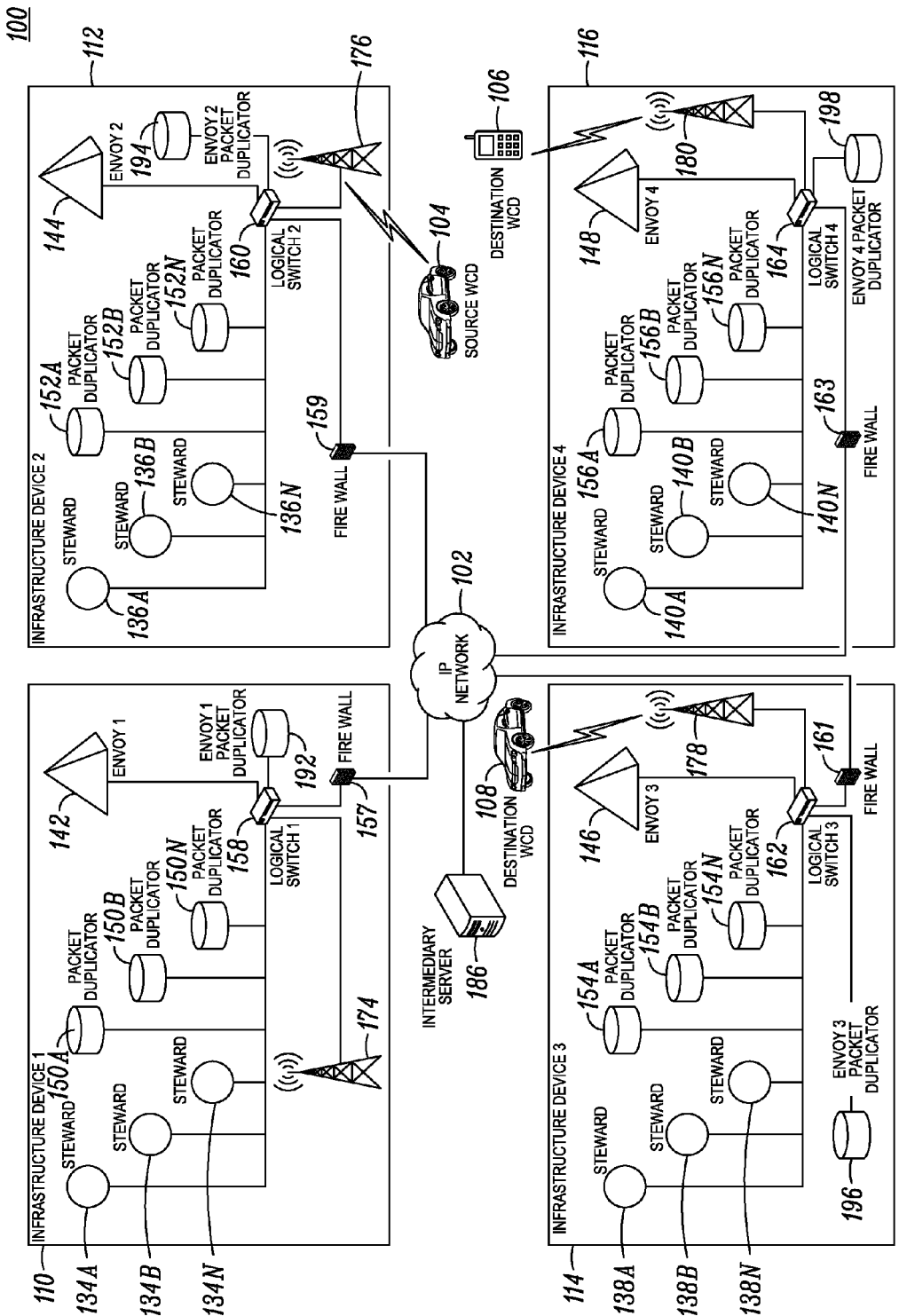
FIG. 3 is a block diagram which illustrates a wide area communications network in accordance with some embodiments.

FIG. 3 is a block diagram which illustrates a communications network 100 in accordance with some embodiments. The network 100 illustrated in FIG. 3 shares many of the same elements as the network 10 illustrated in FIG. 1, and for sake of clarity, commonly numbered elements of the same series will not be described here again.

Figure 4:
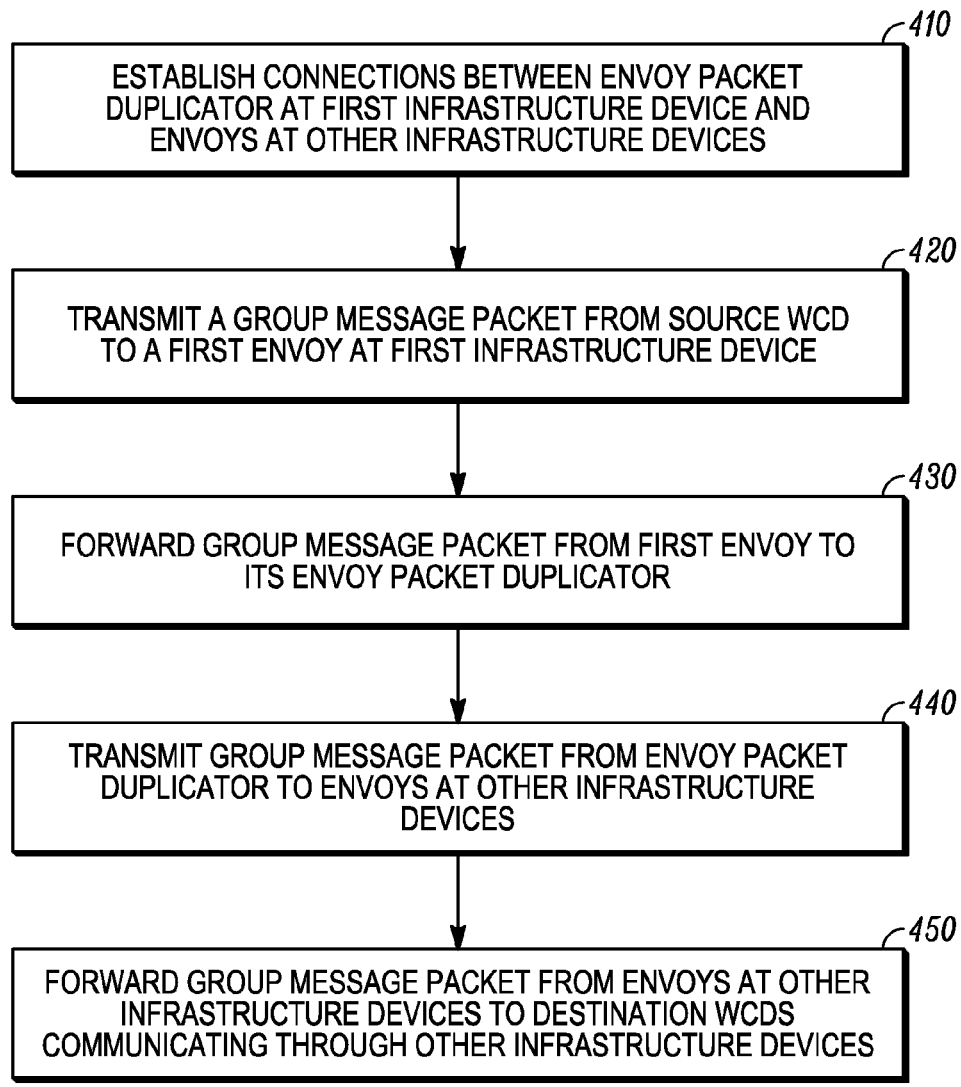
FIG. 4 is a flow chart which illustrates operation of the envoy packet duplicator of FIG. 3 in accordance with some embodiments.

As illustrated in FIG. 3, a new module called an envoy packet duplicator modules 192, 194, 196 198 is introduced at each infrastructure device 110, 112, 114, 116. As will be described in detail below, by implementing the envoy packet duplicator module 194 at infrastructure device 112, the complexity of message exchanges described above with reference to FIGS. 1 and 2 can be greatly reduced, for example, as illustrated in FIG. 4, where FIG. 4 is a flow chart which illustrates operation of the envoy packet duplicator 194 of FIG. 3 in accordance with some embodiments.

At step 410, connections or communication pathways are established between the envoy packet duplicator module 194 for source WCD 104 and envoy modules 146, 148 which are implemented at infrastructure devices 114 and 116, respectively. The destination WCDs 108, 106 are also located at and communicating through infrastructure devices 114 and 116, respectively.

At step 420, the source WCD 104 transmits a group message packet to an envoy module 144 at the infrastructure device 112. At step 430, the envoy module 144 forwards the group message packet to the envoy packet duplicator module 194 that is co-located with the envoy module 144 at the infrastructure device 112. At step 440, the envoy packet duplicator module 194 duplicates the group message packet to generate two identical media packets and transmits the duplicated group message packets to the envoy modules 146, 148 which are implemented at infrastructure devices 114 and 116, respectively.

At step 450, the envoy modules 146, 148 which are implemented at infrastructure devices 114 and 116, respectively, forward the group message packet to the destination WCDs 108, 106 which are also located at and communicating through infrastructure devices 114 and 116, respectively.

Thus, the envoy packet duplicator module 194 at infrastructure device 112 can communicate duplicated group message packets to envoys at other infrastructure devices without involving modules at the home infrastructure device of the device that originated that group message packet. For example, the envoy packet duplicator 194 at infrastructure device 112 can now communicate duplicated group message packets to the envoy modules 146, 148 at infrastructure devices 114, 116 without involving steward module 134B and its corresponding packet duplicator 150B at infrastructure device 110. As such, there is no need to communicate the group message packet from the envoy module 144 at infrastructure device 112 to the steward 134B, no need to send the group message packet from the steward 134B to the packet duplicator 150B, and no need to separately transmit the group message packet from the packet duplicator 150B to the steward modules 138A, 136N at infrastructure devices 114, 112, and then from the steward modules 138A, 136N to the envoys 146, 148 and eventually to the WCD destination devices 108, 106. As a result, a significant number of message exchanges can be eliminated when communicating the group message packet to other WCDs that belong to the group, but are located at different infrastructure devices, thereby making the overall group communication process more efficient and significantly reducing throughput delay.

Techniques will now be described with reference to FIGS. 3-15 for efficiently communicating a group message packet among wireless client devices (WCDs) in a dispatch radio communication system that is implemented over a wide area network (WAN). The WAN can be, for example, an IP-based peer-to-peer dispatch communication network.

Distribution List Generation

As described above, each steward module can build or generate WCD distribution lists (DLs) for group communications of each WCD that steward module supports. A particular distribution list (DL) includes: a list of destination WCD identifiers (DWCD_IDs) (e.g., MAC address) for each of the destination WCDs that belong to a communication group associated with a particular communication group identifier.

In accordance with the disclosed embodiments, a number of techniques can be used to generate a WCD distribution list. These techniques vary depending on where information concerning WCD identifiers (WCD_IDs), destination WCD identifiers (DWCD_IDs), steward module identifiers (SE_IDs), and destination steward module identifiers (DSE_IDs) is initially provisioned/stored in the network. Depending on the implementation, this information can be provisioned at the source WCD 104, the home steward module of the source WCD 134B and/or at the intermediary server 186. Steward modules regularly provide their steward module identifier (SE_ID) and corresponding network socket to the intermediary server 186. As such, in each of the embodiments described below with reference to FIGS. 5-9, the intermediary server 186 maintains a table that maps a steward module identifier (SE_ID) to a corresponding network socket for each of the steward modules.

FIGS. 5-9 are message flow diagrams which illustrate methods for generating a WCD distribution list at a steward module in accordance with various embodiments. In the examples described in FIGS. 5-9, the home steward module 134B of source WCD 104 will generate a WCD distribution list for group communications transmitted by WCD 104; however, although not described below, it will be appreciated that steward module 134B can use the same methods to generate other WCD distribution lists for different group communications transmitted by WCD 104 or other WCDs, and that each of the steward modules can use the same methods to generate other WCD distribution lists for their respective WCDs.

At step 502, source WCD 104 sends its current envoy module 144 a report message that includes a WCD identifier (SWCD_ID) for the source WCD and a home steward module identifier (HSE_ID) for the source WCD's home steward module 134B. At step 504, source WCD 104 sends its current envoy module 144 a communication group identifier (CGI) that identifies the communication group that the source WCD 104 is associated with and seeks to communicate a group message packet to.

The current envoy module 144 knows the IP address of the intermediary server 186, and at step 506, the current envoy module 144 sends the intermediary server 186 a message that includes (1) the steward module identifier (HSE_ID) for home steward module 134B of the source WCD 104, (2) a request for a network socket for home steward module 134B, and (3) a request for establishment of a direct communication link or pathway to/with the home steward module 134B.

As mentioned above, all steward modules register with the intermediary server 186, and the intermediary server 186 stores a list of network sockets mapped to their corresponding steward module identifiers (SE_IDs). As such, the intermediary server 186 can determine the network socket for the home steward module 134B. At step 508, the intermediary server 186 sends the network socket for home steward module 134B to the current envoy module 144 of the source WCD 104.

At step 510, the current envoy module 144 of the source WCD 104 sends the communication group identifier (CGI) to the home steward module 134B of the source WCD 104.

Figure 5:
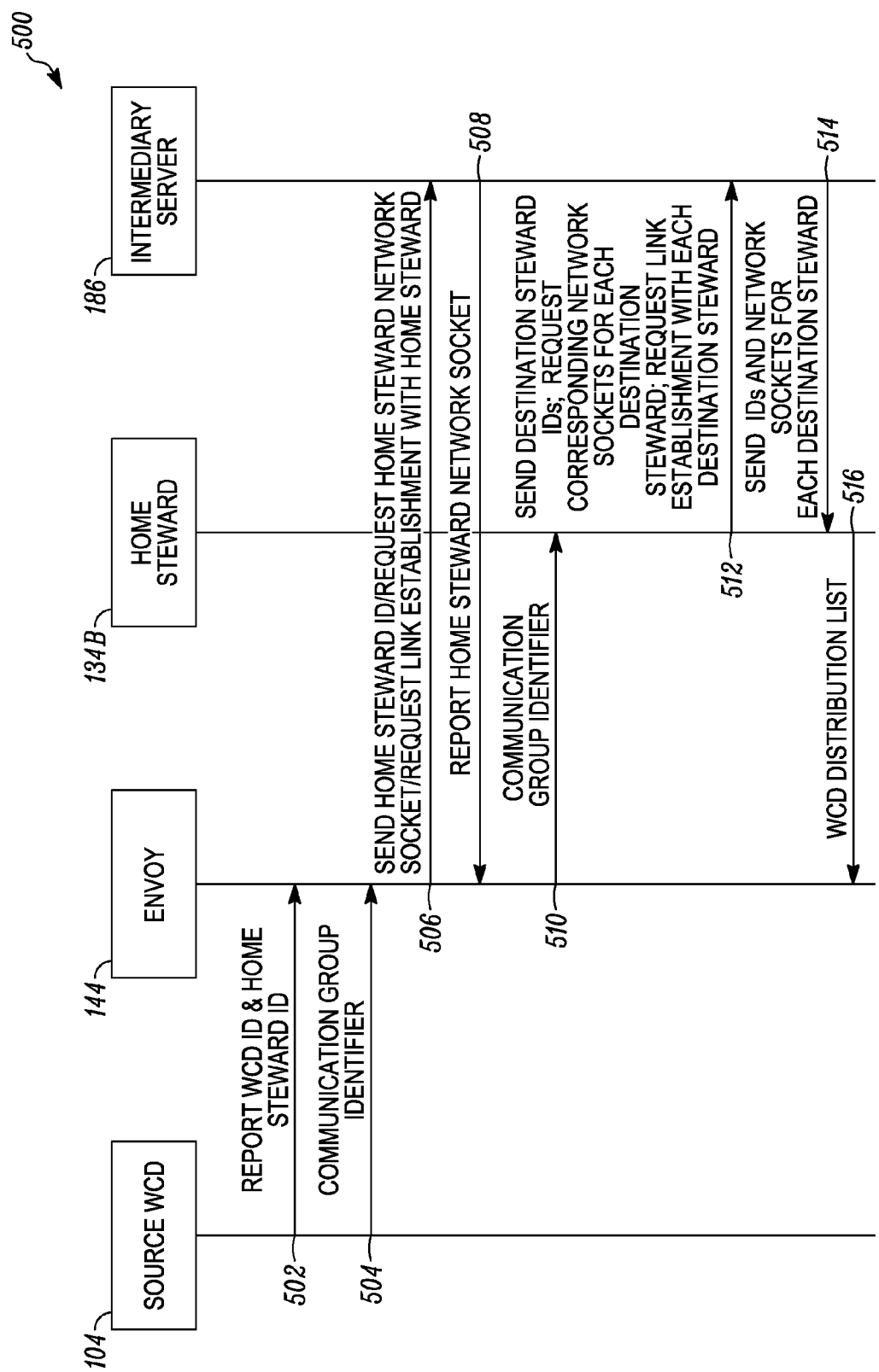
FIGS. 5-9 are message flow diagrams which illustrate methods for generating a WCD distribution list at a steward module in accordance with various embodiments.

In the embodiment illustrated in FIG. 5, the home steward module 134B stores one or more group tables. Each group table is associated with and identified by a unique communication group identifier (CGI). Each group table includes a number of entries (e.g., rows in a table) that includes a list of WCD identifiers (WCD_IDs) for that specific communication group, where each WCD_ID is mapped to or associated with its corresponding destination steward module identifier (DSE_ID). The home steward module 134B of the source WCD 104 uses the CGI to find the appropriate group tables that matches the CGI from step 510, and then uses this group table to generate and store a destination WCD distribution list (DL) that includes destination WCDs identifiers (DWCD_IDs) for each destination WCD in the communication group specified by the CGI.

At step 512, the home steward module 134B sends destination steward module identifiers (DSE_IDs) for each of the destination WCDs to the intermediary server 186, which in this example are identifiers for steward modules 138A, 136N of destination WCDs 108, 106, respectively. In addition, the home steward module 134B also sends a request for network sockets corresponding to each of the destination steward module identifiers (DSE_IDs) for each of the destination WCDs, and a request for establishment of a communication link or pathway to/with each of the home steward modules (corresponding to the destination steward module identifiers (DSE_IDs)) of the destination WCDs.

At step 514, the intermediary server 186 sends network sockets, corresponding to each of the destination steward module identifiers (DSE_IDs) for each of the destination WCDs, to the home steward module 134B. In one implementation, the intermediary server 186 can send the network sockets in a table with each destination steward module identifier (DSE_ID) mapped to or associated with the network socket for its corresponding home steward module. For instance, in this particular example, the intermediary server 186 sends the home steward module 134B the destination steward module identifiers (DSE_IDs) for the home steward modules 138A, 136N each being mapped to (or associated with) the corresponding network sockets for each home steward module 138A, 136N.

The home steward module 134B can now generate and store a table that includes entries (e.g., rows of the table), where each entry includes (1) a destination WCD identifier mapped to or associated with (2) an identifier for its corresponding home steward module (HSE_ID) and (3) the network socket for its corresponding home steward module. Using the information in this table, the home steward module 134B of the source WCD 104 can communicate with the home steward modules 138A, 136N for each of the destination WCDs 108, 106.

At step 516, the home steward module 134B sends the WCD distribution list (DL) to the current envoy module 144.

Figure 6:
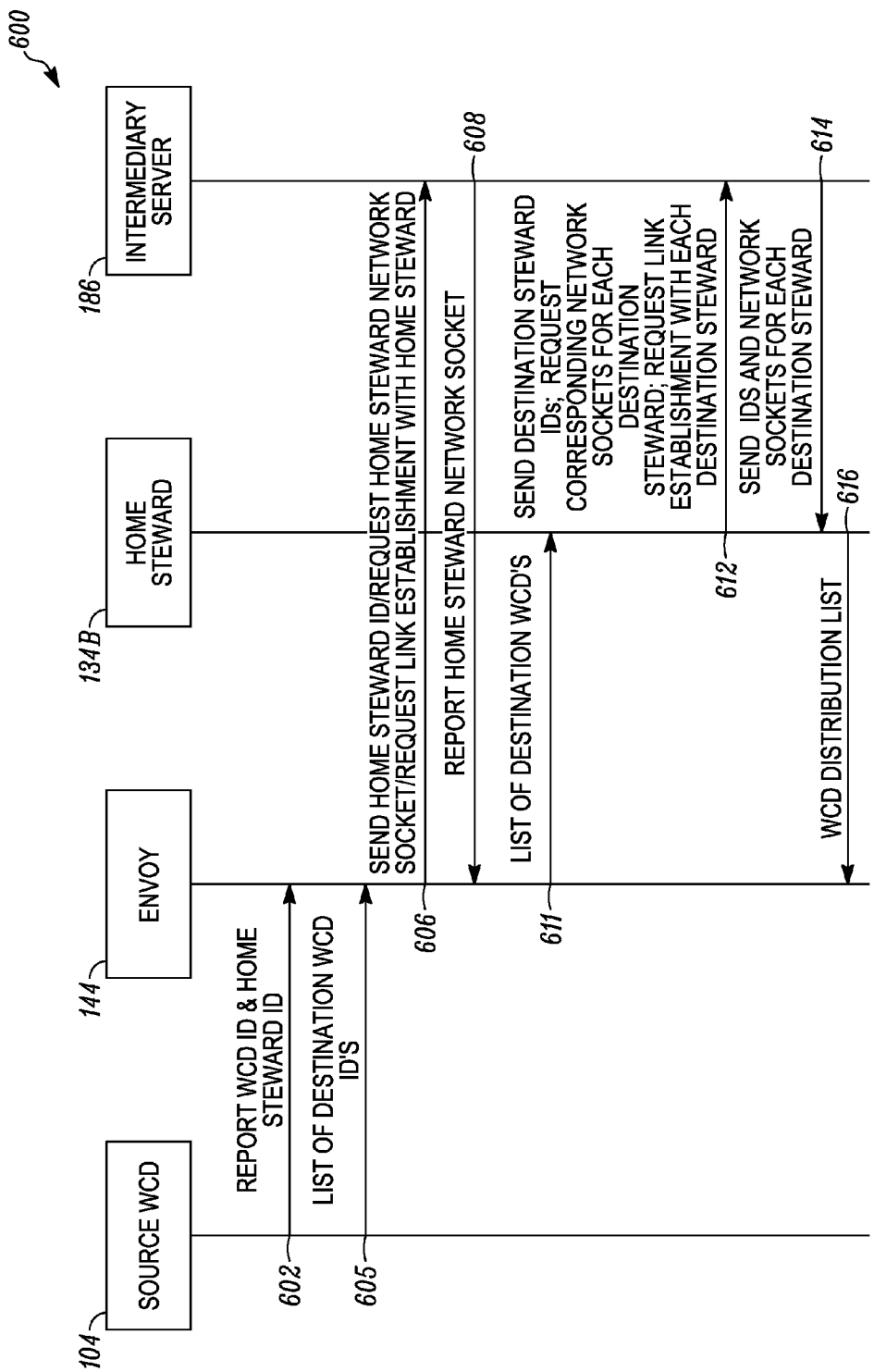

In the embodiment illustrated in FIG. 6, steps 602, 606, 608, 612, 614 and 616 are identical to steps 502, 506, 508, 512, 514, and 516 of FIG. 5. The description of steps 502, 506, 508, 512, 514, and 516 will not be repeated again for sake of brevity. The embodiment illustrated in FIG. 6 also differs from that illustrated in FIG. 5 in that steps 504 and 510 of FIG. 5 are different. The embodiment illustrated in FIG. 6 differs from that illustrated in FIG. 5 in that the source WCD 104 now has the capability to dynamically define a communication group by specifying a list of destination WCD identifiers (DWCD_IDs). The distinctions from steps 504 and 510 of FIG. 5 will now be explained with respect to steps 605 and 611 of FIG. 6.

Following step 602, at step 605, source WCD 104 sends its current envoy module 144 a list of destination WCD identifiers (DWCD_IDs) that identifies each of the destination WCDs belonging to a particular communication group. The list of destination WCD identifiers (DWCD_IDs) is either pre-provisioned on the source WCD 104 or dynamically created by the source WCD 104.

After steps 606 and 608, at step 611, the current envoy module 144 sends the list of destination WCD identifiers (DWCD_IDs) to the home steward module 134B of the source WCD 104. In this embodiment, the home steward module 134B can directly use the list of destination WCD identifiers (DWCD_IDs) to directly generate a WCD distribution list including identifiers for destination WCDs (DWCD_IDs) 106, 108.

This embodiment also differs from that illustrated in FIG. 5 in that the home steward module 134B is initially provisioned with (and stores) a WCD/HSE table that includes all of the WCD identifier (WCD_ID) for all WCDs in the network, where each of the WCD-IDs is mapped to or associated with an identifier for its corresponding home steward module (HSE_ID). The home steward module 134B uses the list of destination WCD identifiers (DWCD_IDs) from step 611 to extract corresponding destination steward module identifiers (DSE_IDs) from the WCD/HSE table, and then proceeds to step 612, where the home steward module 134B sends destination steward module identifiers (DSE_IDs) for home steward modules 138A, 136N (of destination WCDs 106, 108) to the intermediary server 186, along with a request for network sockets corresponding to each of the destination steward module identifiers (DSE_IDs) and a request for establishment of a communication link or pathway to/with each of the home steward modules. Step 614 and 616 are the same as steps 514 and 516 of FIG. 5, and will not be repeated here for sake of brevity.

Figure 7:
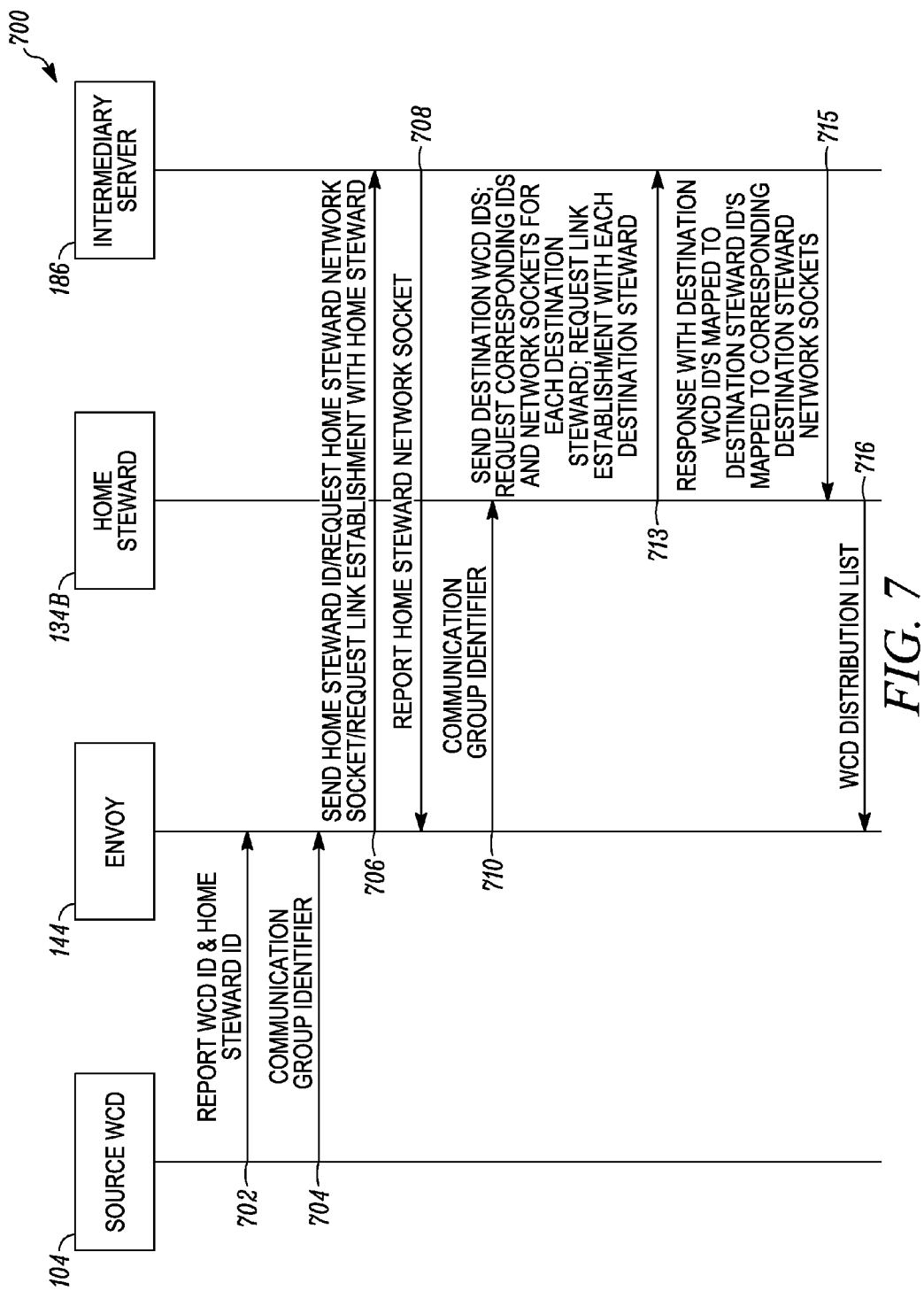

In the embodiment illustrated in FIG. 7, steps 702, 704, 706, 708, 710 and 716 are identical to steps 502, 504, 506, 508, 510 and 516 of FIG. 5. The description of steps 502, 504, 506, 508, 510 and 516 will not be repeated again for sake of brevity.

The embodiment illustrated in FIG. 7 differs from that illustrated in FIG. 5 in that information stored at the source WCD's home steward module 134B is much less simplified. Instead of storing a group table (as in FIG. 5) or a WCD/HSE table (as in FIG. 6), in this embodiment, the source WCD's home steward module 134B is initially provisioned with simplified group tables for each communication group it supports. A simplified group table is associated with and identified by a unique communication group identifier (CGI), and includes a number of entries (e.g., rows in a table) that includes a list of WCD identifiers (WCD_IDs) for that specific communication group, but without mappings of each WCD_ID to its corresponding destination steward module identifier (DSE_ID). As a result, step 512 of FIG. 5 is modified as indicated with respect to step 713 of FIG. 7. At step 713, the home steward module 134B sends to the intermediary server 186 (1) a list of identifiers for destination WCDs (DWCD_IDs), (2) a request for corresponding destination steward module identifiers (DSE_IDs) for each of the destination WCDs, which in this example are identifiers for steward modules 138A, 136N of destination WCDs 108, 106, respectively, (3) a request for network sockets corresponding to each of the destination steward module identifiers (DSE_IDs) for each of the destination WCDs, and (4) a request for establishment of a communication link or pathway to/with each of the home steward modules (corresponding to the destination steward module identifiers (DSE_IDs)) of the destination WCDs.

The intermediary server 186 has all of this information pre-provisioned regarding mappings between all WCD_IDs and their corresponding HSE_IDs except for the sockets. More specifically, in this embodiment, the intermediary sever 186 now stores an additional universal WCD/HSE table that includes a list of all WCD identifiers (WCD_IDs) for all WCDs in the network and mappings of each WCD_ID to its corresponding destination steward module identifier (DSE_ID) and mappings for each network socket of the home steward modules associated with the destination steward module identifier (DSE_ID). As a result, step 514 of FIG. 5 is modified as indicated with respect to step 715 of FIG. 7. At step 715, the intermediary server 186 sends the home steward module 134B (1) a list of identifiers for destination WCDs (DWCD_IDs) mapped to or associated with (2) destination steward module identifiers (DSE_IDs) for each of the destination WCDs and (3) network sockets corresponding to each of the destination steward module identifiers (DSE_IDs). For instance, in this particular example, the intermediary server 186 sends the home steward module 134B a list of identifiers for destination WCDs 108, 106 mapped to the destination steward module identifiers (DSE_IDs) for the home steward modules 138A, 136N each being mapped to (or associated with) the corresponding network sockets for each home steward module 138A, 136N. The method then continues as described in FIG. 5, where the home steward module 134B generates and stores a table that includes entries (e.g., rows of the table), where each entry includes (1) a WCD identifier (WCD_ID) mapped to or associated with (2) an identifier for its corresponding home steward module (HSE_ID) and (3) the network socket for its corresponding home steward module. Using the information in this table, the home steward module 134B of the can communicate with the home steward modules 138A, 136N for each of the destination WCDs 108, 106. Step 716 is identical to step 516 described above with respect to FIG. 5.

Figure 8:
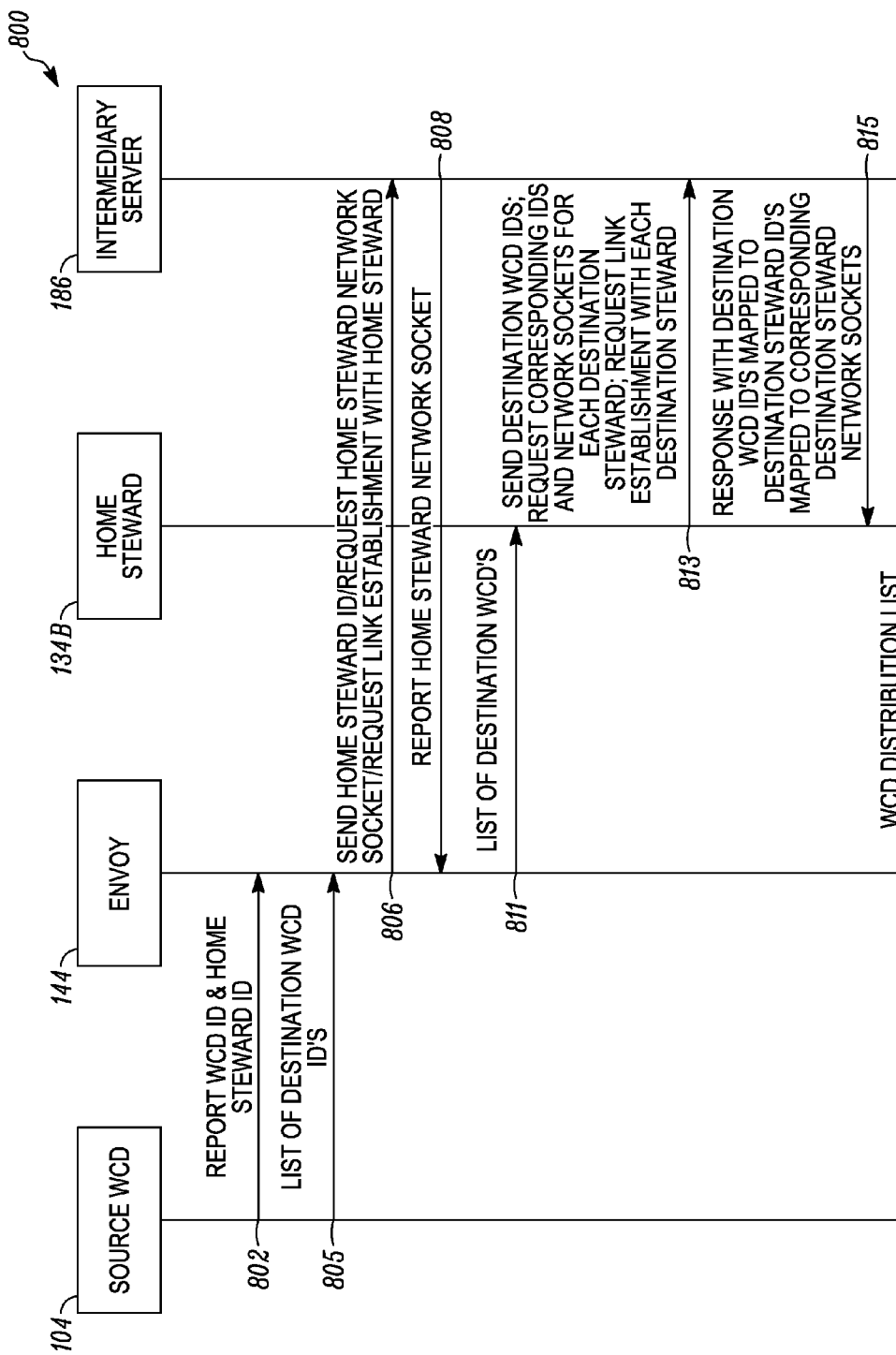

In the embodiment illustrated in FIG. 8, steps 802, 806, 808 and 816 are identical to steps 502, 506, 508 and 516 of FIG. 5. The description of steps 502, 506, 508 and 516 will not be repeated again for sake of brevity. Steps 504, 510, 512 and 514 of FIG. 5 are different in comparison to steps 805, 811, 813 and 815 of FIG. 8. Steps 805 and 811 of FIG. 8 are similar to steps 605 and 611 of FIG. 6, and steps 813 and 815 of FIG. 8 are similar to steps 713 and 715 of FIG. 7.

In this embodiment, at step 811, the current envoy module 144 of the source WCD 104 sends the list of destination WCD identifiers (DWCD_IDs) to the home steward module 134B of the source WCD 104. In this example, the home steward module 134B can generate a WCD distribution list including identifiers for destination WCDs (DWCD_IDs).

At step 813, the home steward module 134B sends to the intermediary server 186 (1) a list of identifiers for destination WCDs (DWCD_IDs), (2) a request for corresponding destination steward module identifiers (DSE_IDs) for each of the destination WCDs, which in this example are identifiers for steward modules 138A, 136N of destination WCDs 108, 106, respectively, (3) a request for network sockets corresponding to each of the destination steward module identifiers (DSE_IDs) for each of the destination WCDs, and (4) a request for establishment of a communication link or pathway to/with each of the home steward modules (corresponding to the destination steward module identifiers (DSE_IDs)) of the destination WCDs.

In this embodiment, like that in FIG. 7, the intermediary server 186 stores an additional universal WCD/HSE table that includes a list of all WCD identifiers (WCD_IDs) for all WCDs in the network and mappings of each WCD_ID to its corresponding destination steward module identifier (DSE_ID) and mappings for each network socket of the home steward modules associated with the destination steward module identifier (DSE_ID). At step 815, the intermediary server 186 sends the home steward module 134B (1) a list of identifiers for destination WCDs (DWCD_IDs) mapped to or associated with (2) destination steward module identifiers (DSE_IDs) for each of the destination WCDs and (3) network sockets corresponding to each of the destination steward module identifiers (DSE_IDs). For instance, in this particular example, the intermediary server 186 sends the home steward module 134B a list of identifiers for destination WCDs 108, 106 mapped to the destination steward module identifiers (DSE_IDs) for the home steward modules 138A, 136N each being mapped to (or associated with) the corresponding network sockets for each home steward module 138A, 136N. The method 800 then continues as specified above.

Figure 9:
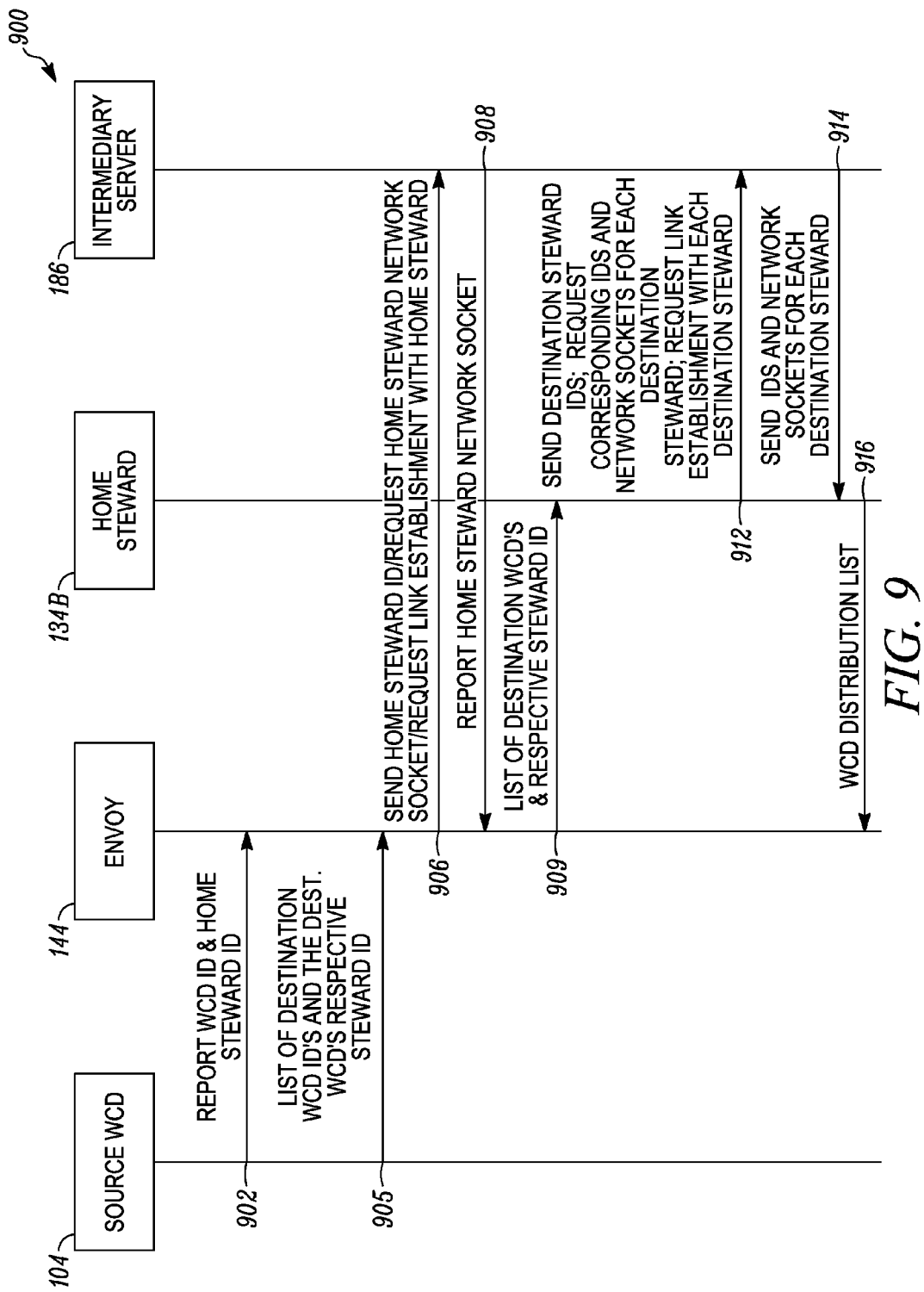

In the embodiment illustrated in FIG. 9, steps 902, 906, 908, 912, 914 and 916 are identical to steps 502, 506, 508, 512, 514 and 516 of FIG. 5. The description of steps 502, 506, 508, 512, 514 and 516 will not be repeated again for sake of brevity. Steps 504 and 510 of FIG. 5 are different in comparison to steps 905 and 909 of FIG. 9.

In this embodiment, the source WCD 104 is provisioned with and stores a group table. The group table includes a number of entries (e.g., rows in a table) that includes a list of destination WCD identifiers (DWCD_IDs) for that specific communication group, where each DWCD_ID is mapped to or associated with its corresponding destination steward module identifier (DSE_ID). In this embodiment, at step 905, source WCD 104 sends its current envoy module 144 the group table.

The source WCD's current envoy module 144 knows the IP address of the intermediary server 186, and at step 906, the current envoy module 144 sends the intermediary server 186 a message that includes (1) the steward identifier (HSE_ID) for home steward module 134B of the source WCD 104, (2) a request for a network socket for home steward module 134B of the source WCD 104, and (3) a request for establishment of a communication link or pathway to/with the home steward module 134B of the source WCD 104.

In this embodiment, at step 909, the current envoy module 144 of the source WCD 104 sends the group table to the home steward module 134B of the source WCD 104. At step 912, the home steward module 134B extracts the destination steward module identifiers (DSE_IDs) for each of the destination WCDs from this group table and sends them to the intermediary server 186, along with a request for network sockets corresponding to each of the destination steward module identifiers (DSE_IDs) for each of the destination WCDs, and a request for establishment of a communication link or pathway to/with each of the home steward modules (corresponding to the destination steward module identifiers (DSE_IDs)) of the destination WCDs.

At step 914, the intermediary server 186 sends the network sockets in a table with each home steward module identifiers (HSE_ID) mapped to or associated with their corresponding network sockets. For instance, in this particular example, the intermediary server 186 sends the home steward module 134B the destination steward module identifiers (DSE_IDs)

for the home steward modules 138A, 136N each being mapped to (or associated with) the corresponding network sockets for each home steward module 138A, 136N.

In this embodiment, the home steward module 134B has the group table (described above) stored which includes a number of entries (e.g., rows in a table), where each entry includes a destination WCD identifier mapped to or associated with its corresponding destination steward module identifier (DSE_ID). From this group table, the home steward module 134B can generate and store a table that includes entries (e.g., rows of the table), where each entry includes (1) a WCD identifier (WCD_ID) mapped to or associated with (2) an identifier for its corresponding home steward module (HSE_ID) and (3) the network socket for its corresponding home steward module. Using the information in this table, the home steward module 134B of the source WCD 104 can communicate with the home steward modules 138A, 136N for each of the destination WCDs 108, 106.

At step 916, the home steward module 134B sends the WCD distribution list (DL) to the current envoy module 144.

Figure 10:
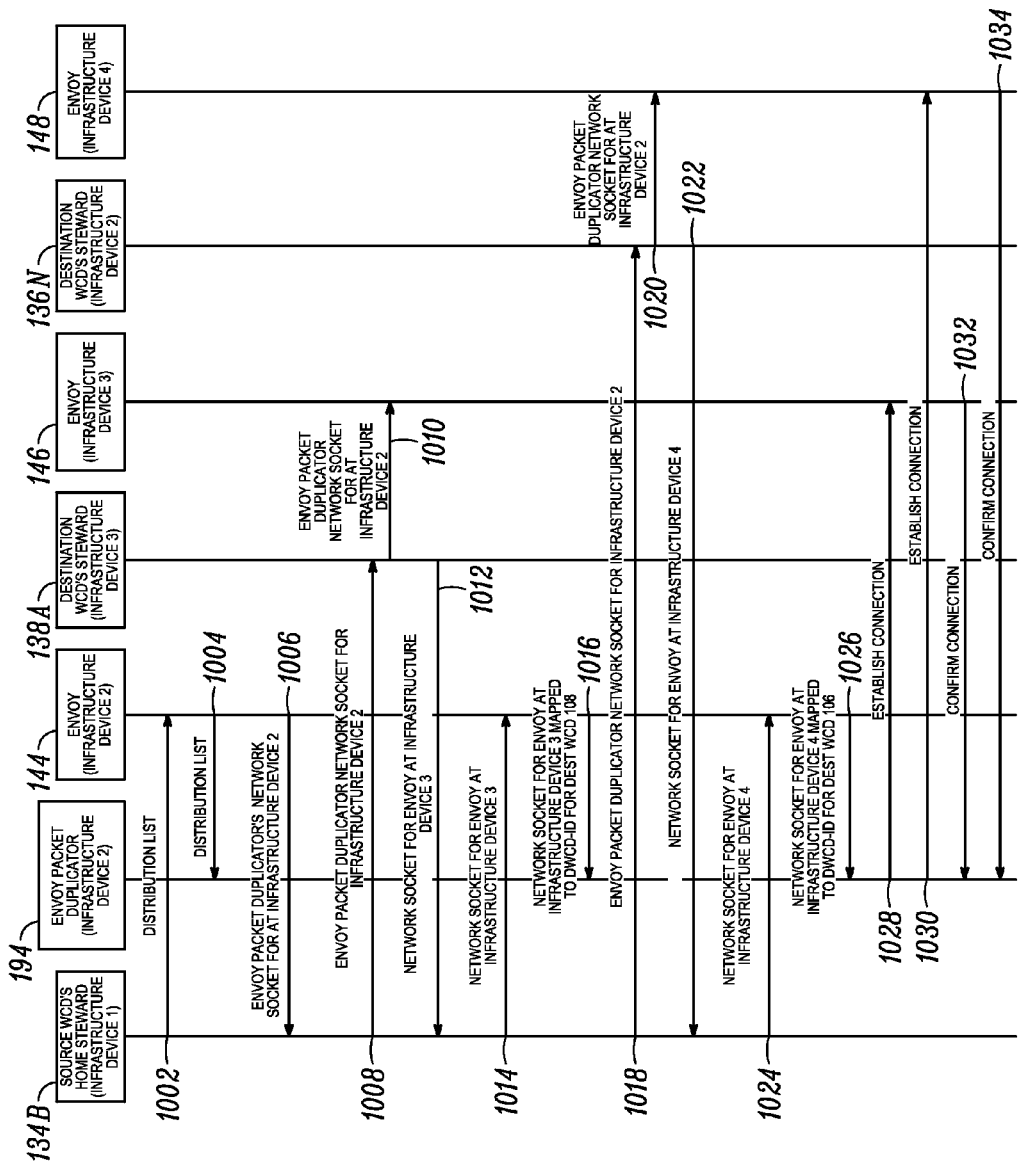
FIG. 10 is a message flow diagram which illustrates one example of a method for establishing communication connections between an envoy packet duplicator implemented at one infrastructure device and envoy modules implemented at other infrastructure devices in the communications network of FIG. 3.

Pre-Established Communication Pathways Between Envoy Packet Duplicator and Envoy Modules FIG. 10 is a message flow diagram in accordance with one embodiment which illustrates one example of a method 500 for establishing communication connections between an envoy packet duplicator 192 at an infrastructure device 110 and envoy modules 146, 148 at infrastructure devices 114, 116 in the communications network of FIG. 3.

It will be appreciated that prior to communication steps 502-534, the source WCD 104 was initially associated with infrastructure device 110 with steward module 134B and packet duplicator 150B being assigned to source WCD 104. The source WCD 104 has roamed from infrastructure device 110, and is now located at and communicating through infrastructure device 112. Envoy module 144 now serves as the envoy module for source WCD 104, and has established a connection with the steward module 134B for source WCD 104. Techniques for establishing this connection are described, for example, in FIG. 2 of United States Patent Application Publication Number 20080305791, referenced above.

In addition, steward module 134B for source WCD 104 has generated a distribution list, using any of the methods described above, that includes information regarding destination WCDs 106, 108 that are to receive particular group message packets from the source WCD 104. Techniques for generating the distribution list are described above with reference to FIGS. 5-9.

On the other hand, destination WCD 108 has not roamed from its initial or home infrastructure device 114. As such, the envoy module 146 at infrastructure device 114 serves as the envoy for destination WCD 108, and has established a connection with the steward module 138A for the destination WCD 108. Similar to source WCD 104, destination WCD 106 has roamed from its initial/home infrastructure device 112 to infrastructure device 116. As such, envoy module 148 at infrastructure device 116 serves as the envoy for destination WCD 106, and has established a connection with the steward module 136N (located at infrastructure device 112) for destination WCD 106.

Destination WCDs 108, 106 are specified in the distribution list for source WCD 104, and envoy modules 146, 148 serve as envoys for destination WCDs 108, 106.

In accordance with some embodiments, the following communication steps 1002-1034 take place to establish connections between the envoy packet duplicator 194 (at infrastructure device 112) and envoy modules 146, 148 for destination WCDs 108, 106. The communication steps 1002-1034 occur before the source WCD 104 seeks to transmit a group message packet, which significantly improves set up time when the source WCD 104 decides to communicate a group message packet as described in FIG. 6.

At step 1002, the steward module 134B for source WCD 104 communicates a distribution list (generated using any of the techniques described above) to the envoy module 144 for source WCD 104, and at step 1004, the envoy module 144 communicates the distribution list to the envoy packet duplicator module 194 that is co-located at infrastructure device 112. At step 1006, the envoy module 144 also communicates a network socket of its envoy packet duplicator module 194 to the steward module 134B for source WCD 104. The envoy module 144 and the envoy packet duplicator module 194 are co-located at infrastructure device 112 and share the same network address. The network address can be an IP address, MAC address, a URL, or other Domain Name System (DNS) resolvable address.

As noted above, the steward module 134B for source WCD 104 has previously established connections to the envoy module 144 for source WCD 104, and to the steward module 138A for destination WCD 108 and to the steward module 136N for WCD 106.

During generation of the distribution list (e.g., at step 514 of FIG. 5), the steward module 134B obtains socket numbers for all destination steward modules. At step 1008, the steward module 134B can forward the network socket of the envoy packet duplicator 194 to the steward module 138A for destination WCD 108 over the previously established connections.

At step 1010, the steward module 138A can forward the network socket of the envoy packet duplicator 194 to the envoy module 146 for destination WCD 108 over the connection that was previously established between the steward module 138A and the envoy module 146.

As noted above, the steward module 138A for destination WCD 108 has previously established connections to the envoy module 146 for destination WCD 108, and to the steward module 134B. In another implementation, the steward module 138A can provide the steward module 134B with the mapping of the network socket number for envoy module 146 to the WCD_ID of destination WCD 108. In another implementation, at step 1012 the steward module 138A can forward the network socket of the envoy module 146 to the steward module 134B. Although not illustrated in FIG. 10, when the steward module 134B receives the network socket of envoy module 146, the steward module 134B can determine that (1) the socket number for envoy module 146 maps to the socket number for steward module 138A simply because steward module 138A has indicated that is so; (2) that the socket number for steward module 138A maps to WCD_ID for destination WCD 108 (because the steward module 134B has all of these mappings of WCD_IDs to steward network sockets from generation of the distribution list) and (3) therefore the network socket for envoy module 146 maps to WCD_ID for destination WCD 108. In one implementation, the steward module 134B can then map the network socket number for envoy module 146 to the WCD_ID of destination WCD 108. The method then proceeds to step 1014.

At step 1014, the steward module 134B can then send envoy module 144, over the connection that was previously established between the steward module 134B and the envoy module 144, the mapping of the network socket of the envoy module 146 mapped to the WCD_ID for the destination WCD 108.

At step 1016, the envoy module 144 sends envoy packet duplicator module 194 the mapping (i.e., mapping of the network socket of the envoy module 146 mapped to WCD_ID for destination WCD 108). The envoy packet duplicator 194 stores the mapping in a group table. This group table is then eventually used at step 1150 of FIG. 11, as will be described below.

Next the method proceeds to steps 1018-1026, which are similar to step 1008-1016 described above. As noted above, during generation of the distribution list (e.g., at step 514 of FIG. 5), the steward module 134B obtains socket numbers for all destination steward modules.

At step 1018, the steward module 134B for source WCD 104 communicates the network socket of envoy packet duplicator module 194 to steward module 136N for destination WCD 106, and at step 1020, the steward module 136N for destination WCD 106 communicates the network socket of envoy packet duplicator module 194 to the envoy module 148 for destination WCD 106.

At step 1022, steward module 136N for destination WCD 106 communicates the network socket of envoy module 148 to the steward module 134B for source WCD 104. In one implementation, the steward module 136N can provide the steward module 134B with the mapping of the network socket number for envoy module 148 to the WCD_ID of destination WCD 106. In another implementation, the method then proceeds to step 1014, and when the steward module 134B receives the network socket for envoy module 148, the steward module 134B can determine that (1) the network socket for envoy module 148 maps to the network socket for steward module 136N, (2) that the network socket for steward module 136N maps to WCD_ID for destination WCD 106 (because the steward module 134B has all of these mappings of WCD_IDs to steward network sockets from generation of the distribution list) and (3) therefore the network socket for envoy module 148 maps to the WCD_ID for the destination WCD 106. The steward module 134B can generate a mapping of the network socket for envoy module 148 to the WCD_ID for the destination WCD 106.

At step 1024, the steward module 134B for source WCD 104 communicates the mapping (of network socket for envoy module 148 mapped to the WCD_ID of destination WCD 106) to the envoy module 144 for source WCD 104.

Figure 11:
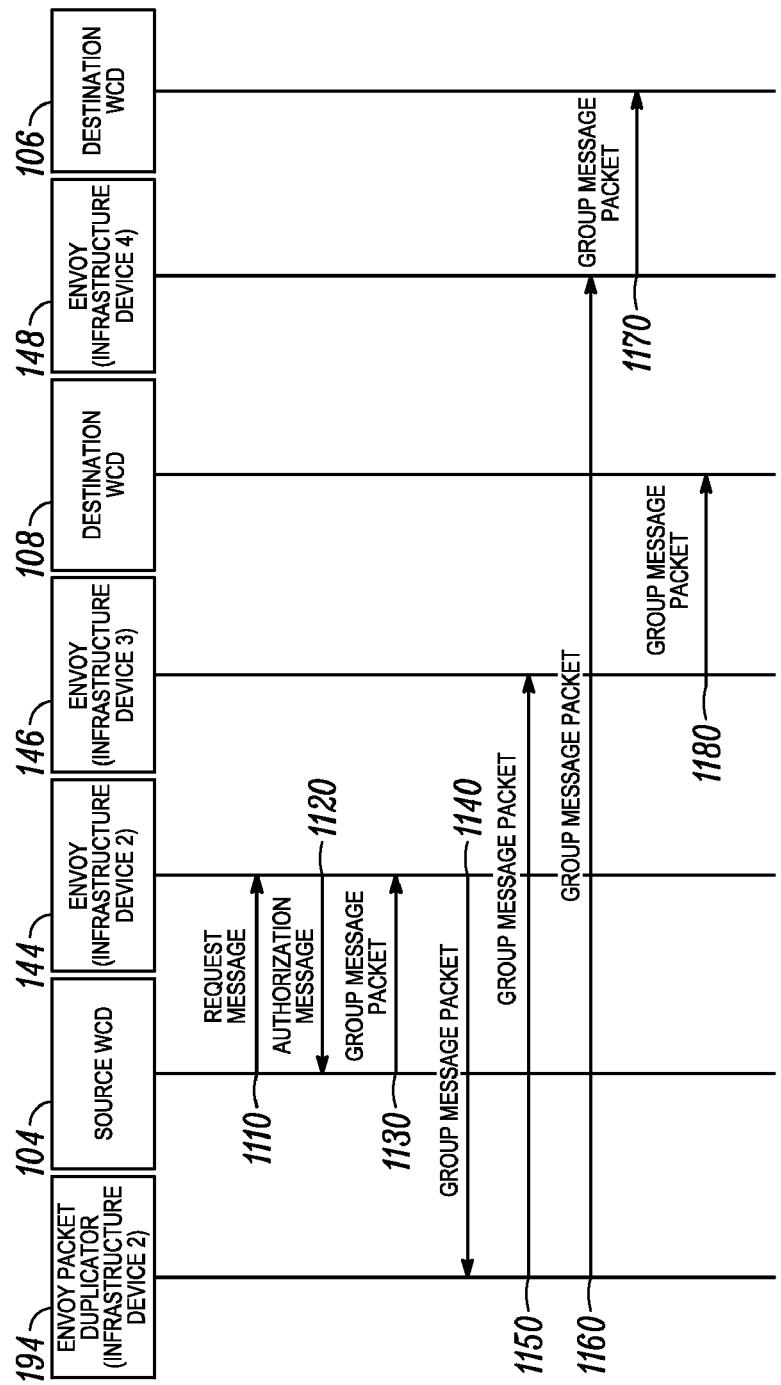
FIG. 11 is a message flow diagram in accordance with one embodiment which illustrates distribution of information from a wireless communication device at one infrastructure device to other wireless communication devices at other infrastructure devices in the communications network of FIG. 3.

At step 1026, the envoy module 144 communicates the mapping to the envoy packet duplicator module 194, and the envoy packet duplicator module 194 stores the mapping of network socket for envoy module 148 to the WCD_ID for destination WCD 106 for future use (e.g., at step 1160 of FIG. 11). In one implementation, the envoy packet duplicator 194 stores this mapping in a group table that stores envoy network sockets mapped to WCD_ID for destination WCDs.

At steps 1028 and 1030, the envoy packet duplicator module 194 establishes a connection to envoy modules 146, 148, respectively, and at steps 1032 and 1034, the envoy modules 146, 148 acknowledge or confirm establishment of their respective connections to envoy packet duplicator module 194. As such, after completion of step 1034, communication pathways are established between the envoy packet duplicator module 194 and envoy module 146 (at infrastructure device 114) and envoy module 148 (at infrastructure device 116).

Group Message Packet Distribution

FIG. 11 is a message flow diagram in accordance with one embodiment which illustrates the flow of a group message packet from a source wireless communication device (WCD) 104 to other destination WCDs 106, 108 located in the communications network 100 of FIG. 3. As illustrated source WCD 104 is presently located at one infrastructure device 112 and other destination WCDs 106, 108 on the distribution list for source WCD 104 are located at and communicating through infrastructure devices 116 and 114, respectively.

After setting up connections or communication pathways between the envoy packet duplicator module 194 for source WCD 104 and envoy modules 146, 148 which are implemented at infrastructure devices 114 and 116, respectively, as described with reference to FIG. 10, the source WCD 104 seeks to communicate a group message packet to other destination WCDs 106, 108.

At step 1110, when the source WCD 104 seeks to transmit a group message packet to WCD 108 at infrastructure device 114 and WCD 106 at infrastructure device 116, the user of the source WCD 104 can request the channel, for example, by pushing a button, which sends a request message to an envoy module 144 at the infrastructure device 112. If channel resources are available, the envoy module 144 responds with an authorization message at step 1120.

In the description that follows, additional details of steps 1130 through 1180 of FIG. 11 will be described with reference to FIGS. 12-15 since some of the message exchanges illustrated at steps 1130 through 1180 in FIG. 11 are actually more complex that shown. Specifically, FIGS. 12-15 are block diagrams of the communications network of FIG. 3 which illustrate messages exchanged between various network modules during steps 1130 through 1180 of the message flow illustrated in FIG. 11.

Figure 12:
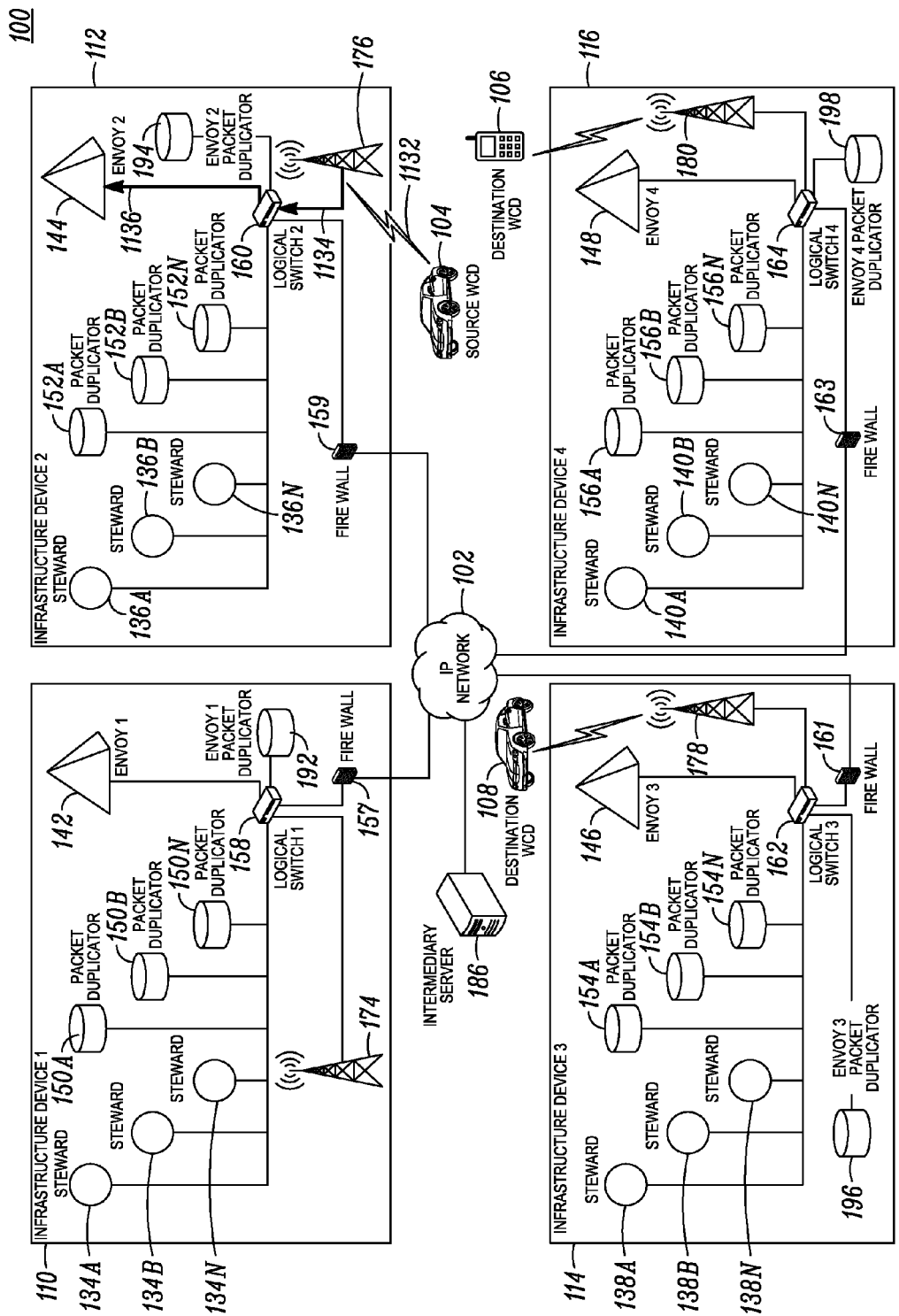
FIGS. 12-15 are block diagrams of the communications network of FIG. 3 which illustrate messages exchanged between various network modules during various steps that take place during the message flow illustrated in FIG. 11 in accordance with some embodiments.

At step 1130, the source WCD 104 transmits a group message packet to an envoy module 144 at the infrastructure device 112. In particular, as illustrated in FIG. 12, at step 1132 the source WCD 104 transmits a group message packet that is received at communication module 176 of the infrastructure device 112. At step 1134, the communication module 176 forwards the group message packet to logical switch, which then forwards the group message packet to envoy 144 at step 1136.

Figure 13:
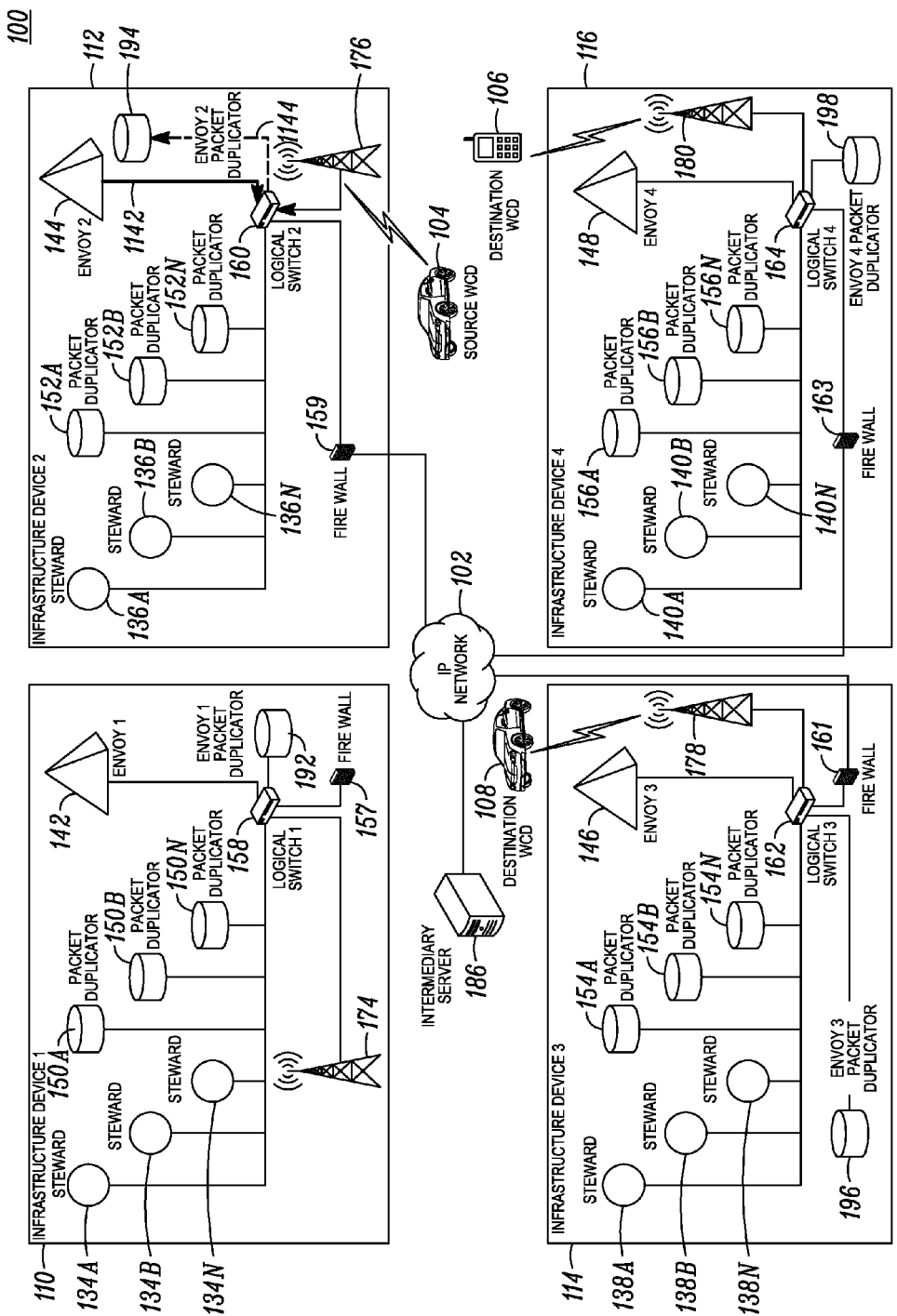

At step 1140, the envoy module 144 forwards the group message packet to the envoy packet duplicator module 194 that is co-located with the envoy module 144 at the infrastructure device 112. In particular, as illustrated in FIG. 13, at step 1142 the envoy module 144 sends the group message packet to logical switch, which then passes the group message packet to the envoy packet duplicator module 194 at step 1144.

Figure 14:
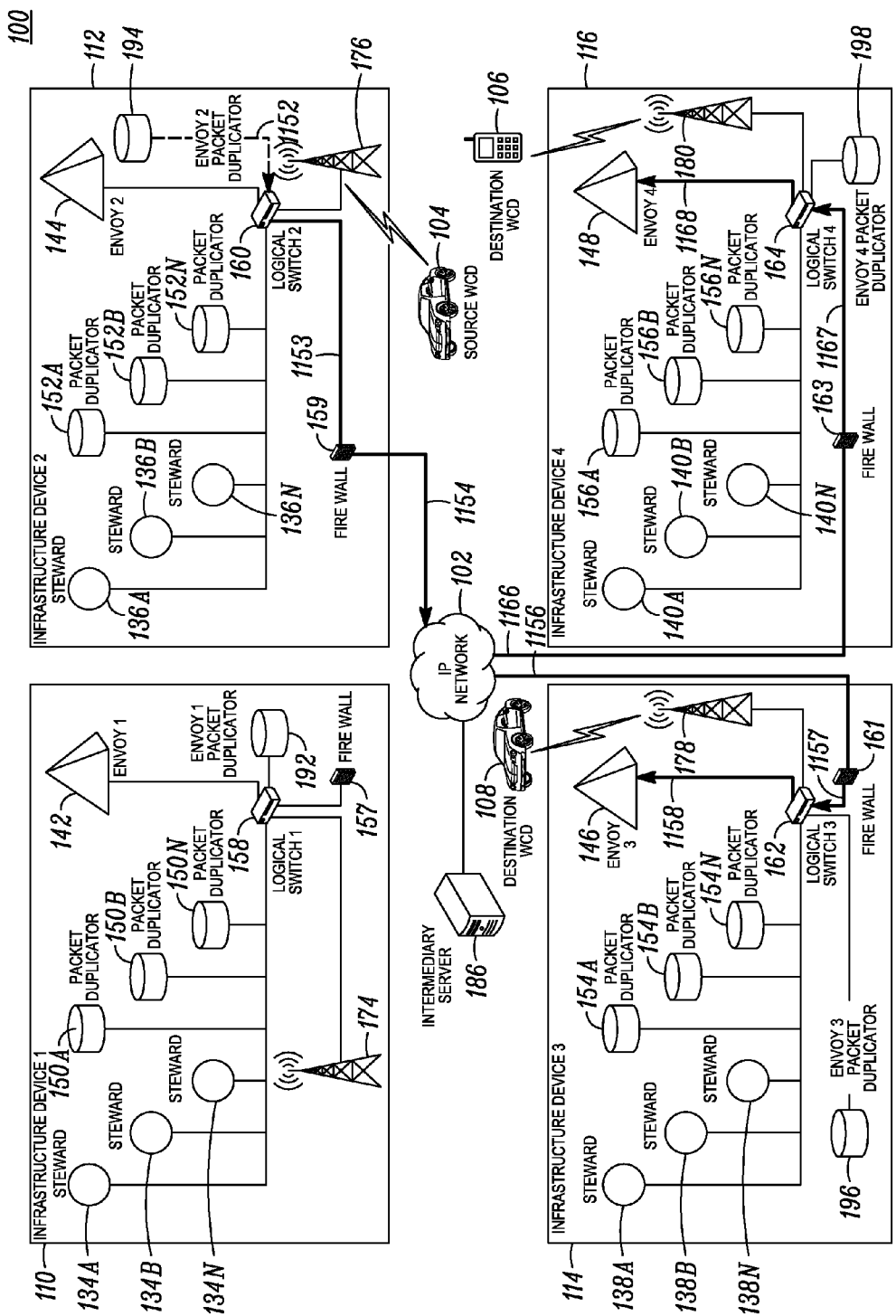

At steps 1150 and 1160, the envoy packet duplicator module 194, makes identical copies of the group message packet and transmits those copies of the group message packet to the envoy modules 146, 148 which are implemented at infrastructure devices 114 and 116, respectively. In particular, as illustrated in FIG. 14, at step 1152, the envoy packet duplicator module 194 creates duplicate copies of the group message packet, and transmits copies of the group message packet to the logical switch. At step 1153 the logical switch transmits the copies of the group message packet through firewall 159 to the IP network 102 (step 1154). Routers (not illustrated) in the IP network 102 determine the destination addresses of each copy of the group message packet, and then transmit one copy of the group message packet to infrastructure device 114 (step 1156) and another copy of the group message packet to the infrastructure device 116 (step 1166). At steps 1157, 1167, the firewalls 161, 163 at infrastructure devices 114, 116 allow the group message packets to pass through to logical switch 162, 164, respectively. Ports are kept open between infrastructure device processes such as envoy modules, packet duplicator modules and steward modules located on different infrastructure devices by exchanging "keepalive" messages between these differently located processes on these infrastructure devices. At step 1158, logical switch 162 forwards one copy of the group message packet to envoy module 146, and at step 1168, logical switch 164 forwards one copy of the group message packet to envoy module 148.

Figure 15:
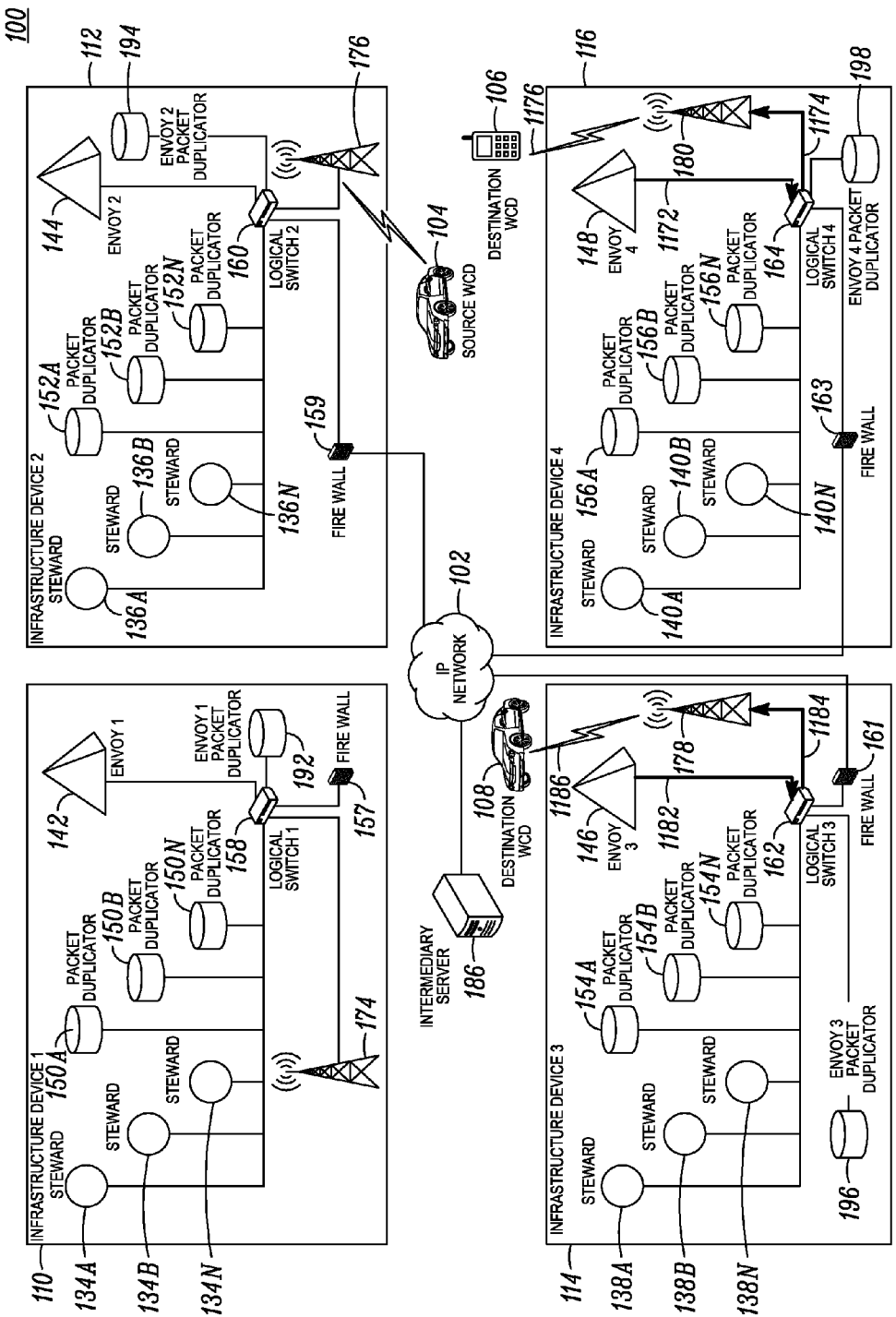

At step 1170 and 1180, the envoy modules 146, 148 which are implemented at infrastructure devices 114 and 116, respectively, forward the group message packet to the destination WCDs 108, 106 which are also located at and communicating through infrastructure devices 114 and 116, respectively. In particular, as illustrated in FIG. 15, at step 1182, the envoy module 146 forwards its copy of the group message packet to logical switch 162, which sends the copy of the group message packet to communication module 178 at step 1184. At step 1186, the communication module 178 transmits the copy of the group message packet over-the-air (OTA) via an antenna (not illustrated) to destination WCD 108. Similarly, at step 1172, the envoy module 148 forwards its copy of the group message packet to logical switch 164, which sends the copy of the group message packet to communication module 180 at step 1174. At step 1176, the communication module 180 transmits the copy of the group message packet over-the-air (OTA) via an antenna (not illustrated) to destination WCD 106.

Thus, when the source WCD 104 communicates the group message packet, the group message packet goes from source WCD 104 to the envoy module 144 at infrastructure device 112 (step 1130), to the envoy Packet Duplicator 194 at infrastructure device 112 (step 1140), and then directly to the other envoy modules 146, 148 (steps 1150 and 1160).

As can be appreciated by comparing FIG. 11 to FIG. 2, the envoy packet duplicator module 194 can reduce the complexity of message exchanges during a group communication since the envoy packet duplicator module 194 at infrastructure device 112 can now communicate duplicated packets to the envoy modules 146, 148 at infrastructure devices 114, 116 directly without having to send the group message packet(s) to other modules first before subsequently reaching envoy modules 146, 148 thus minimizing throughput delay.

This message flow reduces the number of messages exchanged to eventually deliver the group message packet to the destination WCDs 108, 106, and thereby reduces throughput delay. Accordingly, the overall group communication sequence is greatly streamlined and more efficient.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. As used herein, the term "coupled" is defined as connected, although not necessarily directly and not necessarily mechanically. A device or structure that is "configured" in a certain way is configured in at least that way, but may also be configured in ways that are not listed.

As used herein, the term "module" can refer to a self-contained element that is implemented using hardware, software, firmware or any combination thereof. It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for establishing communication pathways between infrastructure devices in a wide area communication network, the infrastructure devices comprising a home infrastructure device of a source wireless communication device (WCD), a first infrastructure device and a second infrastructure device, the method comprising:

generating, at a home steward module of the source WCD, a destination WCD distribution list for communications from the source WCD to a first communication group comprising the source WCD and a first destination WCD, and communicating the destination WCD distribution list to an envoy packet duplicator module located at the first infrastructure device, the source WCD communicating through a first envoy module, both of which are located at the first infrastructure device, prior to a direct link being established for the source WCD from the first infrastructure device to the second infrastructure device;

communicating, from the home steward module, a first network socket of the envoy packet duplicator module to a second envoy module for the first destination WCD that is located at the second infrastructure device;

generating, at the home steward module, a first mapping comprising a second network socket for the second envoy module mapped to a first destination WCD identifier of the first destination WCD, and communicating the first mapping to the envoy packet duplicator module; and establishing, prior to transmission of a group message packet to the first communication group by the source WCD, a first communication connection between the first network socket and the second network socket, wherein the first communication connection traverses the Internet and at least one of a firewall or Network Address Translator is present along the first communication connection such that the envoy packet duplicator module and the second envoy module are each protected from the Internet by the at least one of the firewall or Network Address Translator, wherein the envoy packet duplicator module shares the first network socket with the first envoy module and is able to establish a link to the second envoy module upon receiving the second network socket before duplicating and sending packets to the first destination WCD through the second network socket.

2. The method according to claim 1, wherein the wide area communication network further comprises an intermediary server, and further comprising:

regularly communicating steward module identifiers and corresponding network sockets from each steward module in the wide area communication network to the intermediary server, wherein the steward modules in the wide area communication network comprise the home steward module, a second steward module located at the second infrastructure device, and other steward modules; and maintaining a first table at the intermediary server that maps each of the steward module identifiers to a corresponding network socket for a corresponding one of the steward modules.

3. The method according to claim 2, further comprising:

storing, at the home steward module, a group table comprising a plurality of entries, wherein each entry in the group table is associated with and identified by a communication group identifier (CGI), wherein a first entry in the group table comprises a list of destination WCD identifiers for destination WCDs belonging to the first communication group identified by the CGI, wherein each of the destination wireless client device identifiers is mapped to a corresponding destination steward module identifier;

communicating, from the source WCD to the first envoy module, a report message that includes a source WCD identifier for the source WCD and a home steward module identifier for the home steward module;

communicating, from the source WCD to the first envoy module, a CGI that identifies the first communication group that the source WCD is associated with;

communicating, from the first envoy module to the intermediary server, a message that includes (1) the home steward module identifier for the home steward module of the source WCD, (2) a request for a home steward network socket for the home steward module, and (3) a request for establishment of a communication pathway with the home steward module;

determining, at the intermediary server based on the first table, the home steward network socket for the home steward module;

communicating the home steward network socket for the home steward module from the intermediary server to the first envoy module of the source WCD; and communicating the CGI from the first envoy module of the source WCD to the home steward module of the source WCD, and matching, at the home steward module, the CGI to the first entry in the group table.

4. The method according to claim 3, wherein the step of generating, at a home steward module for the source WCD, a destination WCD distribution list, further comprises:

generating, at the home steward module based on the first entry from the group table, the destination WCD distribution list for communications from the source WCD to the first communication group, wherein the destination WCD distribution list comprises: a list of destination WCDs identifiers for each destination WCD, in the first communication group identified by the CGI.

5. The method according to claim 4, further comprising:

communicating, from the home steward module to the intermediary server, (1) a list of destination steward module identifiers for each of the destination WCDs, (2) a request for network sockets corresponding to each steward module identified by the destination steward module identifiers for each of the destination WCDs, and (3) a request for establishment of a communication pathway with each of the home steward modules corresponding to the destination steward module identifiers;

communicating, from the intermediary server to the home steward module, a first mapping table comprising an entry for each destination steward module of each of the destination WCDs, each entry comprising (1) a destination steward module identifier for each destination steward module of each of the destination WCDs, and (2) a corresponding network socket of each destination steward module mapped to the corresponding destination steward module identifier; and generating, at the home steward module based on the first mapping table, a group mapping table comprising a plurality of entries, wherein each entry comprises a destination WCD identifier for each destination WCD mapped to a corresponding destination steward module identifier and a network socket for the corresponding destination steward module.

6. The method according to claim 5, wherein the step of communicating the destination WCD distribution list to an envoy packet duplicator module located at the first infrastructure device, comprises:
communicating the destination WCD distribution list from the home steward module to the first envoy module for the source WCD; and
communicating the destination WCD distribution list from the first envoy module to the envoy packet duplicator module located at the first infrastructure device.

7. The method according to claim 6, further comprising:
communicating, from the first envoy module to the home steward module of the source WCD, the first network socket of the envoy packet duplicator module.

8. The method according to claim 7, wherein the step of communicating, from the home steward module, a first network socket of the envoy packet duplicator module to the second envoy module for the first destination WCD, comprises:
communicating, from the home steward module to the second steward module, which is associated with the first destination WCD, the first network socket of the envoy packet duplicator; and
communicating the first network socket from the second steward module to the second envoy module for the first destination WCD, wherein the first destination WCD is associated with the second envoy module.

9. The method according to claim 8, wherein the step of generating a first mapping at the home steward module for the source WCD, wherein the first mapping comprises the second network socket for the second envoy module mapped to the first wireless client device identifier of the first destination WCD, and communicating the first mapping to the first envoy module, comprises:
communicating, from the second steward module to the home steward module for the source WCD, the second network socket of the second envoy module for the first destination WCD;
determining, at the home steward module for the source WCD, that (1) the second network socket of the second envoy module maps to a third network socket for the second steward module, (2) that the third network socket for the second steward module maps to a first destination WCD identifier for the first destination WCD and (3) that the second network socket of the second envoy module maps to the first destination wireless client device identifier for the first destination WCD;
generating the first mapping at the home steward module for the source WCD, wherein the first mapping comprises the second network socket for the second envoy module mapped to the first wireless client device identifier of the first destination WCD;
communicating the first mapping from the home steward module to the first envoy module; and
communicating the first mapping from the first envoy module to the envoy packet duplicator module, and storing the first mapping at the envoy packet duplicator module.

10. The method according to claim 7, wherein a second destination WCD is initially associated with the first infrastructure device and has a third steward module assigned thereto, wherein a third envoy module is located at a third infrastructure device, and further comprising:
establishing a second communication connection, prior to transmission of a group message packet to the first communication by the source WCD, between the first network socket of the envoy packet duplicator module and a fourth network socket of the third envoy module for second destination WCD.

11. The method according to claim 10, wherein the step of establishing a second communication connection between the first network socket of the envoy packet duplicator module and the fourth network socket of the third envoy module for the second destination WCD, wherein the third envoy module is located at the third infrastructure device, comprises:
communicating, the first network socket of the envoy packet duplicator from the home steward module for source WCD to the third steward module for the second destination WCD, the third steward module located at the first infrastructure device;
communicating, from the third steward module to the third envoy module for the second destination WCD, the first network socket of envoy packet duplicator module, wherein the third envoy module located at the third infrastructure device;
communicating, from the third steward module to the home steward module for the source WCD, a fourth network socket of the third envoy module for the second destination WCD;
determining, at the home steward module for the source WCD, that (1) the fourth network socket of the third envoy module maps to a fifth network socket for the third steward module, (2) that the fifth network socket for the third steward module maps to a second destination wireless client device identifier for second destination WCD and (3) that the fourth network socket of the third envoy module maps to the second destination wireless client device identifier for the second destination WCD;
generating a second mapping at the home steward module for the source WCD, wherein the second mapping comprises the fourth network socket of the third envoy module mapped to the second destination wireless client device identifier for the second destination WCD;
communicating the second mapping from the home steward module to the first envoy module for source WCD;
communicating the second mapping from the first envoy module to the envoy packet duplicator module, and storing the second mapping at the envoy packet duplicator module; and
establishing the second communication connection between the first network socket of the envoy packet duplicator module and the fourth network socket of the third envoy module for the second destination WCD, wherein the third envoy module is located at the third infrastructure device.

12. The method according to claim 2, further comprising:
storing, at the source WCD, a destination WCD identifier table comprising a list of destination WCD identifiers for destination WCDs of the first communication group that the source WCD is associated with;
storing, at the home steward module, a second group table comprising: a list of WCD identifiers for each WCD in the network mapped to corresponding steward module identifiers for each of the WCDs;
communicating, from the source WCD to the first envoy module, a report message that includes a source WCD identifier for the source WCD and a home steward module identifier for the home steward module;
communicating, from the source WCD to the first envoy module, the destination WCD identifier table;
communicating, from the first envoy module to the intermediary server, a message that includes (1) the home steward module identifier for the home steward module of the source WCD, (2) a request for a home steward network socket for the home steward module, and (3) a request for establishment of a communication pathway with the home steward module;

determining, at the intermediary server based on the first table, the home steward network socket for the home steward module;

communicating the home steward network socket for the home steward module from the intermediary server to the first envoy module of the source WCD; and communicating, from the first envoy module of the source WCD to the home steward module of the source WCD, the destination WCD identifier table comprising the list of destination WCD identifiers for destination WCDs of the first communication group.

13. The method according to claim 12, wherein the step of generating, at a home steward module for the source WCD, a destination WCD distribution list, comprises:

generating, at the home steward module based on the destination WCD identifier table, the WCD distribution list including identifiers for destination WCDs.

14. The method according to claim 13, further comprising:

determining, at the home steward module based on the second group table and the list of destination WCD identifiers received from the source WCD, destination steward module identifiers for each of the destination WCDs; and communicating, from the home steward module to the intermediary server, (1) a list of destination steward module identifiers for each of the destination WCDs, (2) a request for network sockets corresponding to each steward module identified by the destination steward module identifiers for each of the destination WCDs, and (3) a request for establishment of a communication pathway with each of the home steward modules corresponding to the destination steward module identifiers;

communicating, from the intermediary server to the home steward module, a first mapping table comprising an entry for each destination steward module of each of the destination WCDs, each entry comprising (1) a destination steward module identifier for each destination steward module of each of the destination WCDs, and (2) a corresponding network socket of each destination steward module mapped to the corresponding destination steward module identifier; and generating, at the home steward module based on the first mapping table, a group mapping table comprising a plurality of entries, wherein each entry comprises a destination WCD identifier for each destination WCD mapped to a corresponding destination steward module identifier and a network socket for the corresponding destination steward module.

15. The method according to claim 2, further comprising:

storing, at the home steward module, a simplified group table comprising: a communication group identifier (CGI) for the first communication group, and a list of destination WCD identifiers for destination WCDs belonging to the first communication group identified by the CGI;

storing, at the intermediary server, a universal group table that maps WCD identifiers for each WCD in the network to a corresponding home steward module identifier and a corresponding network socket for each corresponding home steward module;

communicating, from the source WCD to the first envoy module, a report message that includes a source WCD identifier for the source WCD and a home steward module identifier for the home steward module;

communicating, from the source WCD to the first envoy module, the CGI that identifies the first communication group that the source WCD is associated with;

communicating, from the first envoy module to the intermediary server, a message that includes (1) the home steward module identifier for the home steward module of the source WCD, (2) a request for a home steward network socket for the home steward module, and (3) a request for establishment of a communication pathway with the home steward module;

determining, at the intermediary server based on the first table and the home steward module identifier for the home steward module, the home steward network socket for the home steward module; and communicating the home steward network socket for the home steward module from the intermediary server to the first envoy module of the source WCD; and communicating the CGI from the first envoy module of the source WCD to the home steward module of the source WCD, and matching, at the home steward module, the CGI to the first entry in the simplified group table.

16. The method according to claim 15, wherein the step of generating, at a home steward module for the source WCD, a destination WCD distribution list, comprises:

generating, at the home steward module based on the simplified group table and the CGI, a destination WCD distribution list for communications from the source WCD to the first communication group.

17. The method according to claim 16, further comprising:

communicating, from the home steward module to the intermediary server, (1) the list of destination WCD identifiers, (2) a request for destination steward module identifiers corresponding to each of the destination WCD identifiers mapped to corresponding network sockets for each of the destination steward module identifiers for each of the destination WCDs, and (3) a request for establishment of a communication pathway with each of the destination steward modules corresponding to the destination steward module identifiers;

generating a first mapping table at the intermediary server based on the universal group table and destination WCD identifiers from the home steward module, wherein the first mapping table comprises: an entry for each destination steward module of each of the destination WCDs, each entry comprising: a destination WCD identifier for each of the destination WCDs mapped to a corresponding destination steward module identifier for each destination steward module and a corresponding network socket of each destination steward module; and communicating the first mapping table from the intermediary server to the home steward module.

18. The method according to claim 2, further comprising:

storing, at the source WCD, a destination WCD identifier table comprising a list of destination WCD identifiers for destination WCDs of the first communication group that the source WCD is associated with;

storing, at the home steward module, a simplified group table comprising: a communication group identifier (CGI) for the first communication group, and a list of destination WCD identifiers for destination WCDs belonging to the first communication group identified by the CGI;

storing, at the intermediary server, a universal group table that maps WCD identifiers for each WCD in the network to a corresponding home steward module identifier and a corresponding network socket for each corresponding home steward module, and communicating, from the source WCD to the first envoy module, a report message that includes a source WCD identifier for the source WCD and a home steward module identifier for the home steward module;

communicating, from the source WCD to the first envoy module, the destination WCD identifier table;

communicating, from the first envoy module to the intermediary server, a message that includes (1) the home steward module identifier for the home steward module of the source WCD, (2) a request for a home steward network socket for the home steward module, and (3) a request for establishment of a communication pathway with the home steward module;

determining, at the intermediary server based on the first table and the home steward module identifier for home steward module, the home steward network socket for the home steward module; and communicating the home steward network socket for the home steward module from the intermediary server to the first envoy module of the source WCD; and communicating the destination WCD identifier table for the first communication group from the first envoy module of the source WCD to the home steward module of the source WCD.

19. The method according to claim 18, wherein the step of generating, at a home steward module for the source WCD, a destination WCD distribution list, comprises:

generating, at the home steward module, based on the destination WCD identifier table received from the source WCD, the WCD distribution list including identifiers for the destination WCDs.

20. The method according to claim 19, further comprising:

communicating, from the home steward module to the intermediary server, (1) the list of destination WCD identifiers, (2) a request for destination steward module identifiers corresponding to each of the destination WCD identifiers mapped to corresponding network sockets for each of the destination steward module identifiers for each of the destination WCDs, and (3) a request for establishment of a communication pathway with each of the home steward modules corresponding to the destination steward module identifiers;

generating a first mapping table at the intermediary server based on the universal group table and destination WCD identifiers from the home steward module, wherein the first mapping table comprises an entry for each destination steward module of each of the destination WCDs, each entry comprising: a destination WCD identifier for each of the destination WCDs mapped to a corresponding destination steward module identifier for each destination steward module of each of the destination WCDs and a corresponding network socket of each destination steward module, and communicating the first mapping table from the intermediary server to the home steward module.

21. The method according to claim 2, further comprising:

storing, at the source WCD, a third group table comprising: a list of destination WCD identifiers for destination WCDs of the first communication group and corresponding destination steward module identifiers for each destination steward module of each of the destination WCDs;

communicating, from the source WCD to the first envoy module, a report message that includes a source WCD identifier for the source WCD and a home steward module identifier for the home steward module, and communicating, from the source WCD to the first envoy module, the third group table;

communicating, from the first envoy module to the intermediary server, a message that includes (1) the home steward module identifier for the home steward module of the source WCD, (2) a request for a home steward network socket for the home steward module, and (3) a request for establishment of a communication pathway with the home steward module;

determining, at the intermediary server based on the first table, the home steward network socket for the home steward module;

communicating the home steward network socket for the home steward module from the intermediary server to the first envoy module of the source WCD; and communicating, from the first envoy module of the source WCD to the home steward module of the source WCD, the third group table.

22. The method according to claim 21, wherein the step of generating, at a home steward module for the source WCD, a destination WCD distribution list, comprises:

generating, at the home steward module based on the third group table, the WCD distribution list including identifiers for destination WCDs.

23. The method according to claim 22, further comprising:

determining, at the home steward module based on the third group table, the destination steward module identifiers for each of the destination WCDs; and communicating, from the home steward module to the intermediary server, (1) a list of destination steward module identifiers for each of the destination WCDs, (2) a request for network sockets corresponding to each steward module identified by the destination steward module identifiers for each of the destination WCDs, and (3) a request for establishment of a communication pathway with each of the home steward modules corresponding to the destination steward module identifiers;

communicating, from the intermediary server to the home steward module, a first mapping table comprising an entry for each destination steward module of each of the destination WCDs, each entry comprising (1) a destination steward module identifier for each destination steward module of each of the destination WCDs, and (2) a corresponding network socket of each destination steward module mapped to the corresponding destination steward module identifier; and generating, at the home steward module based on the first mapping table, a group mapping table comprising a plurality of entries, wherein each entry comprises a destination WCD identifier for each destination WCD mapped to a corresponding destination steward module identifier and a network socket for the corresponding destination steward module.

24. The method according to claim 1, wherein multicasting is used neither during establishment of the first communication connection nor during transmission of the group message packet.

* * * * *